United States Patent
Peyton Jones et al.

(10) Patent No.: US 10,891,434 B2
(45) Date of Patent: Jan. 12, 2021

(54) SYSTEM AND METHOD FOR GENERATION AND EXECUTION OF ELASTIC SHEET-DEFINED FUNCTIONS AND ARRAYS

(71) Applicant: Microsoft Technology Licensing, LLC, Redmond, WA (US)

(72) Inventors: Simon L. Peyton Jones, Cambridge (GB); Advait Sarkar, Cambridge (GB); Andrew Gordon, Cambridge (GB); Richard Matthew McCutchen, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 16/198,039

(22) Filed: Nov. 21, 2018

(65) Prior Publication Data

US 2020/0167415 A1    May 28, 2020

(51) Int. Cl.
*G06F 40/18* (2020.01)
*G06F 40/103* (2020.01)

(52) U.S. Cl.
CPC ............ *G06F 40/18* (2020.01); *G06F 40/103* (2020.01)

(58) Field of Classification Search
None
See application file for complete search history.

(56) References Cited

U.S. PATENT DOCUMENTS

| | | | |
|---|---|---|---|
| 7,266,763 | B2 | 9/2007 | Peyton-Jones et al. |
| 9,286,285 | B1 | 3/2016 | Vagell et al. |
| 2004/0103366 | A1* | 5/2004 | Peyton-Jones .......... G06F 40/18 715/213 |
| 2006/0036939 | A1 | 2/2006 | Hobbs et al. |
| 2006/0224946 | A1 | 10/2006 | Barrett et al. |

FOREIGN PATENT DOCUMENTS

WO    2014091184 A1    6/2014

OTHER PUBLICATIONS

"Non Provisonal Application Filed in U.S. Appl. No. 15/893,310", filed Feb. 9, 2018, 43 Pages.

(Continued)

*Primary Examiner* — Asher D Kells
(74) *Attorney, Agent, or Firm* — Fiala & Weaver P.L.L.C.

(57) ABSTRACT

Methods for generation and execution of elastic sheet-defined functions and arrays are performed by systems, devices, and apparatuses. Elastic sheet-defined functions are generated from inelastic defined functions. Specific notations for tile ranges and range references of inputs for an inelastic function are generated, and heights, widths, rows, and columns of the inputs are modified with delta variables. Constraints for the delta variables are generated and mapped to solve for a constraints solution for a given inelastic function. Based on the constraints solution, an elastic sheet-defined function is generated that takes dynamic input ranges of different sizes. Elastic sheet-defined functions are executed to prevent overlap of tiles and ranges for variables by generating new sheets for tiles and ranges, dynamically moving tiles and ranges, and assigning cells as arrays. Software programming arrays are also dynamically sized in a similar manner.

20 Claims, 6 Drawing Sheets

(56) References Cited

OTHER PUBLICATIONS

"Non Provisonal Application Filed in U.S. Appl. No. 16/024,580", filed Jun. 29, 2018, 38 Pages.

Abraham, et al., "Inferring Templates from Spreadsheets", In Proceedings of the 28th International Conference on Software Engineering, May 20, 2006, pp. 182-191.

Balson, et al., "User Defined Spreadsheet Functions in Excel", In Proceedings of European Spreadsheet Risks Interest Group, Jul. 2012, 11 Pages.

Blackwell, et al., "Champagne Prototyping: A Research Technique for Early Evaluation of Complex End-User Programming Systems", In Proceedings of the IEEE Symposium on Visual Languages and Human-Centric Computing, Sep. 26, 2004, pp. 47-54.

Blackwell, Alan F., "First Steps in Programming: A Rationale for Attention Investment Models", In Proceedings of the IEEE CS International Symposium on Human-Centric Computing Languages and Environments, Sep. 3, 2002, pp. 2-10.

Caine, Kelly, "Local Standards for Sample Size at CHI", In Proceedings of the CHI Conference on Human Factors in Computing Systems, May 7, 2016, pp. 981-992.

Erwig, et al., "Gencel: A Program Generator for Correct Spreadsheets", In Journal of Functional Programming, vol. 16, Issue 3, May 2006, 35 Pages.

Field, Andy, "Discovering Statistics Using IBM SPSS Statistics", Published in Sage Publications Limited, Jan. 24, 2013, 2617 Pages.

Green, et al., "Usability Analysis of Visual Programming Environments: A 'Cognitive Dimensions' Framework", In Journal of Visual Languages and Computing, vol. 7, Issue 2, Jan. 1996, pp. 1-51.

Gulwani, et al., "Program Synthesis", In Journal of Foundations and Trends in Programming Languages, vol. 4, Issue 1-2, Jul. 11, 2017, 136 Pages.

Hart, et al., "Development of NASA-TLX (Task Load Index): Results of Empirical and Theoretical Research", In Book Human mental workload, vol. 1, Issue 3, Dec. 1988, 46 Pages.

Jones, et al., "A User-Centred Approach to Functions in Excel", In Proceedings of the 8th ACM SIGPLAN International Conference on Functional Programming, Aug. 25, 2003, pp. 165-176.

McCutchen, et al., "Object Spreadsheets: A New Computational Model for End-User Development of Data-Centric Web Applications", In Proceedings of the ACM International Symposium on New Ideas, New Paradigms, and Reflections on Programming and Software, Nov. 2, 2016, pp. 112-127.

Mendes, et al., "Tabula: A Language to Model Spreadsheet Tables", In Journal of Computing Research Repository, Jul. 10, 2017, 14 Pages.

Paine, Jocelyn, "Ensuring Spreadsheet Integrity with Model Master", In Journal of Computing Research Repository, Jan. 2008, 15 Pages.

Sarkar, et al., "Calculation View: Multiple-Representation Editing in Spreadsheets", In Proceedings of the IEEE Symposium on Visual Languages and Human-Centric Computing, Oct. 1, 2018, pp. 85-93.

Williams, John, "Spreadsheet Programming with User Defined Types and Functions", In 4th Year Project Report of University of Edinburgh, Mar. 19, 2015, 41 Pages.

"Dynamic Named Range in Excel—Easy Excel Tutorial", Retrieved From: https://web.archive.org/web/20170626190543/https://www.excel-easy.com/examples/dynamic-named-range.html, Jun. 26, 2017, 3 Pages.

Cheusheva, Svetlana, "How to Create and Use Dynamic Named Range in Excel", Retrieved From: https://www.ablebits.com/office-addins-blog/2017/07/19/excel-dynamic-named-range/,Mar. 5, 2018, 11 Pages.

Cortes, et al., "User-defined Functions in Spreadsheets", Retrieved From: http://www.itu.dk/people/sestoft/corecalc/CortesHansen2006.pdf, Sep. 1, 2006, 119 Pages.

McCutchen, et al., "Elastic Sheet-Defined Functions: Generalising Spreadsheet Functions to Variable-Size Input Arrays", Retrieved From: https://www.semanticscholar.org/paper/Elastic-Sheet-Defined-Functions%3A-Generalising-to-McCutchen-Borghouts/ff2c5279f47e92894f50b7d67fc88c40ee73b0ed, Nov. 27, 2018, 27 Pages.

"International Search Report and Written Opinion Issued in PCT Application No. PCT/US19/061340", dated Feb. 28, 2020, 12 Pages.

Cheusheva, Svetlana,"How to Create and Use Dynamic Named Range in Excel", Retrieved From: https://www.ablebits.com/office-addins-blog/2017/07/19/excel-dynamic-named-range/, Jul. 19, 2017, 7 Pages.

* cited by examiner

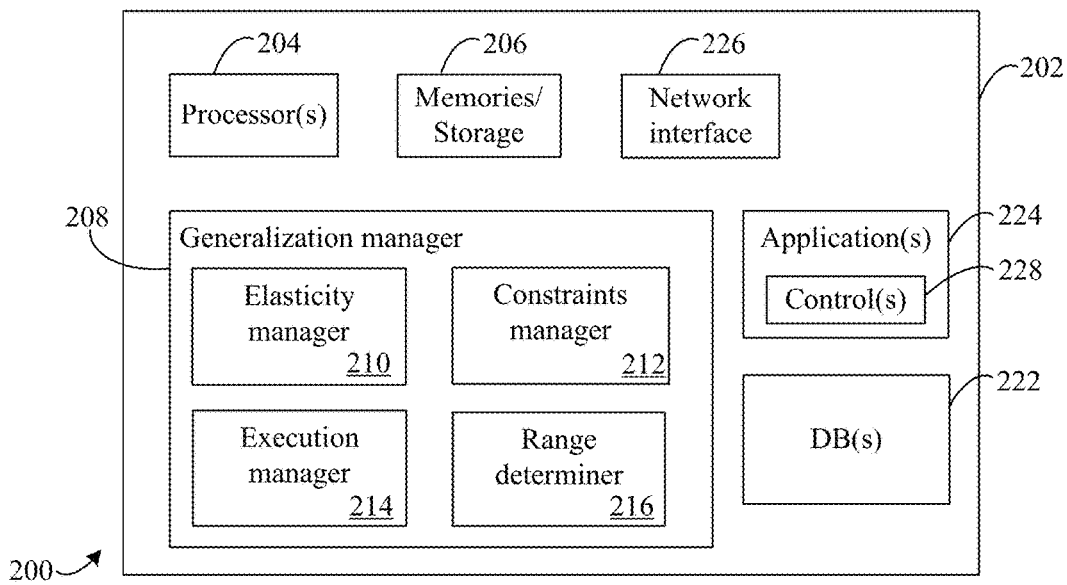
FIG. 1
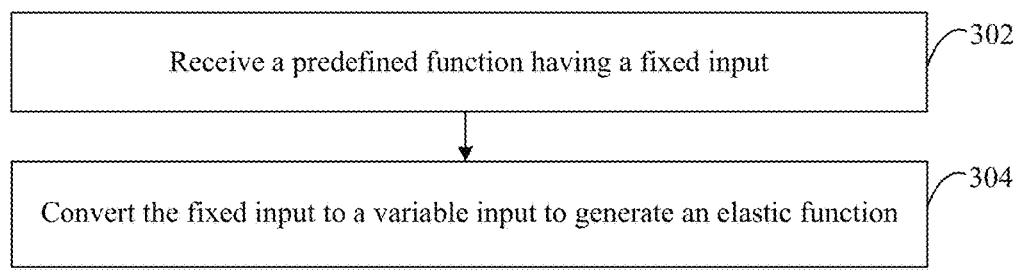
FIG. 2
| Receive a predefined function having a fixed input | 302 |
↓
| Convert the fixed input to a variable input to generate an elastic function | 304 |
FIG. 3

SYSTEM AND METHOD FOR GENERATION AND EXECUTION OF ELASTIC SHEET-DEFINED FUNCTIONS AND ARRAYS

BACKGROUND

Spreadsheets and arrays are tools and structures used in the fields of productivity and programming. In the context of spreadsheets, a sheet-defined function (SDF) is a function that is defined by an example worksheet with specially-identified input and output cells. SDFs provide software engineering benefits of functional abstraction to spreadsheet users, without leaving the native formula language. Any specially-identified example input cell ranges of an SDF require input arrays of a call to the function to be the same size as the defined example.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, devices, and apparatuses for the generation and execution of elastic sheet-defined functions and arrays are disclosed herein. Elastic sheet-defined functions (SDFs) are generated from inelastic defined functions, i.e., functions that require input sizes to be of a certain, fixed value or range. SDFs according to embodiments herein provide generalized functionality to the inelastic defined functions from which they are generated such that variable lengths and ranges of inputs can be utilized for the same functional operations. Generalization includes providing specific notations for tile ranges and range references of inputs for an inelastic function, and modifying the heights, widths, rows, and columns of the input notations with delta variables. Constraints for the delta variables are generated and mapped to solve for a constraints solution for a given inelastic function. Based on the constraints solution, an elastic sheet-defined function is generated that is configured to take dynamic input ranges of different sizes for the same functional operations. Elastic SDFs may be executed in ways that prevent overlap of tiles and ranges for variables by generating new sheets for tiles and ranges, dynamically moving tiles and ranges, and/or assigning cells as arrays. Software programming arrays are also dynamically sized in a similar manner, according to embodiments.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 shows a diagram of a user-defined function with fixed inputs.

FIG. 2 shows a block diagram of a computing system for generation and execution of elastic sheet-defined functions and arrays, according to an example embodiment.

FIG. 3 shows a flowchart for generation and execution of elastic sheet-defined functions and arrays, in accordance with an example embodiment.

Figure 4:
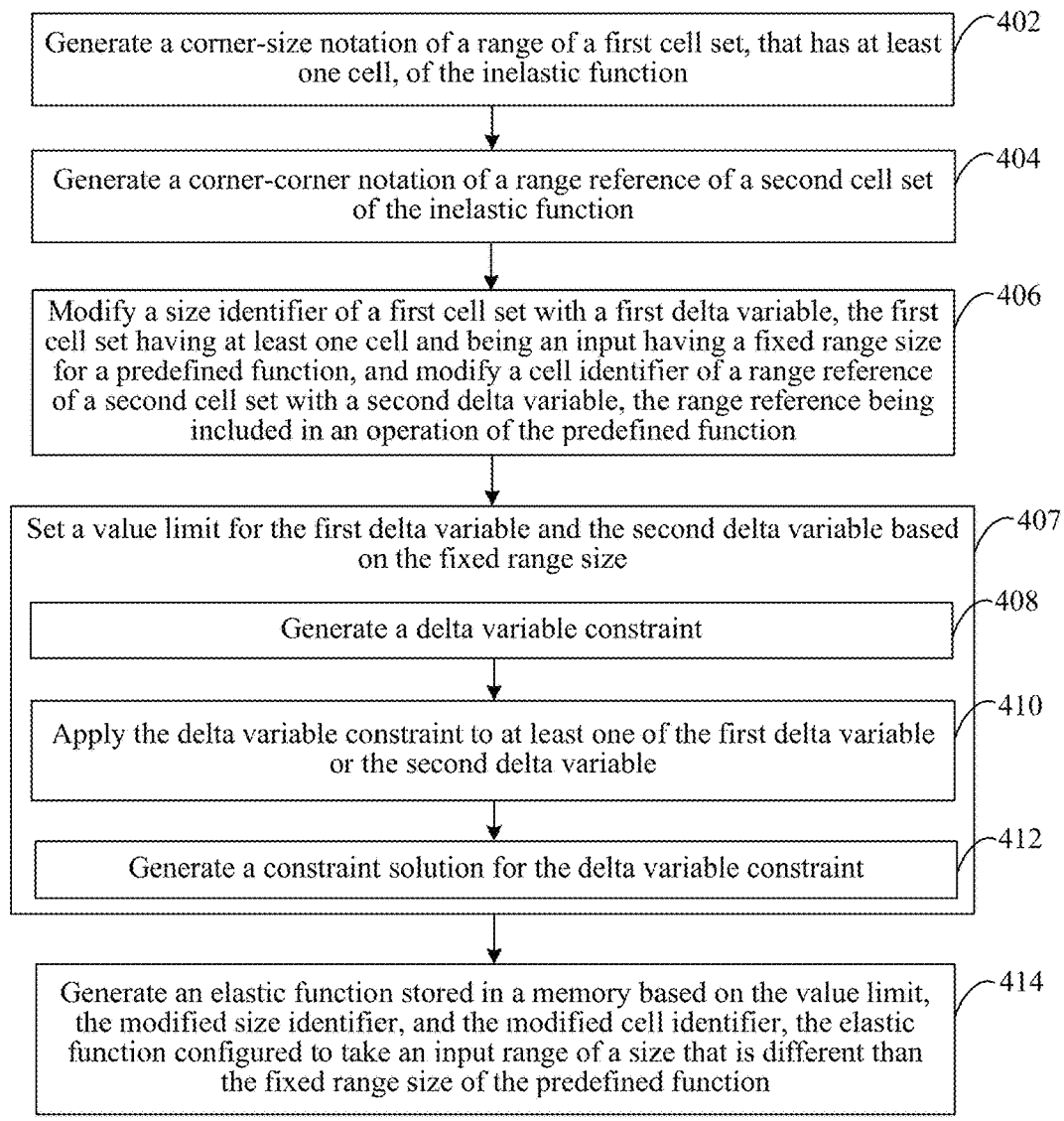
FIG. 4 shows a flowchart that is a more detailed version of the flowchart of FIG. 3 for generation and execution of elastic sheet-defined functions and arrays, in accordance with an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Descriptions related to grids, such as those in spreadsheet programs, may use row-column notations or column-row notations such as "A1" notation, e.g., letter-number. For instance, if a first column is designated as 'A' and a first row is designated as '1', a reference to the top-left cell of the grid may be 'A1'. Grids, rows, and columns may refer to data structures and identifying portions thereof corresponding to machine storage locations such as addresses, registers, and/or the like, e.g., in a memory.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for generalization and elastic sheet-defined functions (SDFs). Specifically, Section II.A describes embodiments for textual notation form and general syntax, Section MB describes elastic SDF generation embodiments, and Section II.C describes example elastic SDF execution embodiments. Section III below describes example mobile device and computing device embodiments that may be used to implement features of the embodiments described herein. Section IV below describes additional examples and advantages, and Section V provides some concluding remarks.

II. Example Embodiments for Generalization and Elastic SDFs

Methods, systems, apparatuses, devices, and computer program products are provided herein for generation and execution of elastic sheet-defined functions and arrays. Elastic sheet-defined functions (SDFs) are generated from inelastic defined functions, i.e., functions that require input sizes to be of a certain value or range, such as user-defined functions (UDFs). Elastic SDFs according to the embodiments herein provide generalized functionality of inelastic defined functions from which they are generated such that variable lengths and ranges of inputs can be utilized for the same functional operations.

Elastic SDFs stretch or shrink the example grid from a UDF as much as necessary to fit the size of their input arrays through generalization of the UDF and application of given input ranges. In accordance with the embodiments herein, the principal generalization of the input SDF is generated as an elastic SDF. Additionally, efficient implementation strategies for elastic SDFs are described below. The various embodiments thus provide for improved user interfaces (UIs) of spreadsheet programs, as well as the ability to utilize instances of a single function for calls thereto that expand or shrink the size of input parameters. In other words, inelastic-defined, fixed-size UDF examples in a grid may be automatically generalized to elastic SDFs which alter the example to file arbitrary-sized inputs.

For instance, consider an example scenario where a user desires to compute an average value of a range of cells in a spreadsheet, e.g., "B2:B11", some of which may be blank and should be excluded from the average calculation. Using a simple textual notation for the spreadsheet grid, such a function may be represented as:

$D3=SUM(B2:B11); D7=COUNT(B2:B11); D11=D3/D7$. (Function 1)

Rather than repeat this logic in many places to compute averages, it would be better to define it once, and call it in many places. As an example, a spreadsheet tool may allow a function definition to be given in an ordinary worksheet with specially-identified input and output cells. A function defined in this manner may be referred to as a sheet-defined function (SDF). Continuing in the example textual notation above, such an SDF may be written as:

```
function AVERAGE(B2: B11) returns D11 {
   D3 = SUM(B2: B11); D7 = COUNT(B2: B11); D11 = D3/D7
}.                                                    (Function 2)
```

However, considering the SDF in Function 2, this function takes only vectors of 10 elements as input. In scenarios where more than 10 elements need to be averaged, this function may return an error due to the mismatch between the range of the provided input and the expected range of the function or may ignore the extra elements, leading to an incorrect result. For example, FIG. 1 shows a diagram of a spreadsheet 100 for the 'average' UDF noted above as Function 2, with fixed, defined inputs, i.e., 10 elements. The defined function 102 is shown for illustrative purposes with the 10-element range (B2:B11) for an input vector 106, a sum result for the 10 elements of input vector 106 at D3, a result for the count operation (D7), and a result for the average operation (D11). That is, when a 10-element range is provided for input vector 106 to the average function, a result can be obtained and provided back, as shown. However, a call 104 to the same average function yields an error because call 104 attempts to provide an 11-element ("eleven"-element) input vector 108 to the average UDF which is limited to an input vector of 10-elements.

The embodiments herein provide solutions to this limitation through generalization of such a function into an elastic SDF to compute an average on vectors of arbitrary size (i.e., vectors with an arbitrary number of elements). For example, generalizing the average function to become an elastic SDF yields Function 3 below, where the "α" term enables elasticity:

```
function AVERAGE<α>( B2: B {α} ) returns D11 {
   D3 = SUM( B2:B {α} ); D7 = COUNT( B2:B {α}); D11 = D3/D7
}.                                                    (Function 3)
```

According to embodiments, the fixed value for the range limit of the input vectors is replaced with α, so now the function can be called on input vectors of any size (i.e., with any number of elements) according to α. It should be noted that this simple example is representative in nature for a large class of problems that users may want to solve by first defining a function that manipulates individual elements of fixed-size input arrays, and then generalizing the function to work on inputs of arbitrary size. Embodiments may utilize algorithms to perform one or more portions of such generalizations, which accounts for basic, as well as subtle and complex, cases in which simple variable substitution does not provide for the generation of robust elastic SDFs.

A. Embodiments for Textual Notation Form and General Syntax

The embodiments herein may be described using a textual notation for spreadsheet programs for descriptive and illustrative purposes including a notation for corner-size ranges and for SDFs, although embodiments are not limited to spreadsheets. The development and generation of generalized SDFs and their notations are also described herein. Accordingly, elastic SDFs are described that work on inputs of varying size. The defined, precise syntax introduced herein thus provides the intellectual tools in the style of programming languages for the described embodiments, e.g., application to spreadsheet programs.

For some embodiments, an inference algorithm may be utilized that generalizes an SDF to an elastic SDF. In such embodiments, formal conditions are described for "regular" generalizations, and proofs are provided showing that the described generalization produce the "principal regular" generalization. Different examples for inference algorithms are described below, such as, for simplified systems that apply to a class of "basic" SDFs, and for arbitrary SDFs. Different examples for execution of elastic SDFs are also described herein, for example, the translation of elastic SDFs to executable form, including a method of implementing elastic tiles using arrays.

The described embodiments improve the operations of programs and develop applications that use functions. For instance, embodiments improve computational and operational aspects of spreadsheets and software development programs, while also improving aspects of user interfaces for such programs. The examples described are not specific to any particular programs or development tools—instead, the generalizations herein expand on the framework and aspects of data structures, e.g., a spreadsheet grid, single- and multi-dimensional arrays and vectors, and/or the like, as well as copy/paste behaviors of absolute and relative references.

The textual notations mentioned above may be used to describe and illustrate the embodiments herein. For example, Table 2 below provides an example set of this textual notation.

In an example for a spreadsheet program, consider a defined function "SHOP" according to the notations introduced herein:

F4=20; F5=30; F6=35; G2=20%

$G4:G6=F4*\$G\$2$ $H4:H6=F4+G4$ $H7=\text{SUM}(H4::\{3,1\})$. (Function 4)

Function 4 computes, in cell H7, the total cost of purchasing the items whose values are respectively provided in cells F4:F6, after accounting for a value added tax (VAT), whose rate is held in cell G2. That is, each cell contains a value computed by Function 4 in the cell. A value is a number, a boolean expression, a string, an error value, an array of values, and/or the like.

The notation form, as described herein, of this sheet fragment consists of a set of range assignments, where a range may be a single cell. The range assignments can be written in any order, and can appear on successive lines or on a single line separated by semicolons. Each range assignment is of form r=F, where r is a range and F is a formula. Ranges r may be ranges as used in spreadsheets. A range r can be denoted in different ways. For example, range r may be denoted by a single cell address a, such as H7 (as noted above, notations herein may identify a cell by a column name and a row number). In another example, range r may be denoted by a rectangular range denoted by two cell addresses for the upper-left and lower-right corners, such as G4:G6, shown above in Function 4. As used herein, such a notation is referred to as a corner-corner notation. Conventional spreadsheets treat a "back to front" range such as G5:G4 as identical to G4:G5. This implicit reversal makes it impossible to represent an empty range. In contrast, the embodiments herein may not utilize implicit reversals, e.g., for size-polymorphic functions. That is, a range G5:G4 is empty, while G6:G4 is simply ill-formed, according to embodiments. In still another example, range r may be described by a rectangular range denoted by a cell address and a size, such as: H4::{3,1}, shown above. This corner-size notation is not present in typical spreadsheet tools/programs, but is introduced herein. The size {nr, nc} (in braces) denotes the number of rows and columns in the range r, respectively. That is, H4::{3,1} is equivalent to H4:H6.

Formulas F, e.g., formulas defined by users prior to generalization for elastic SDFs as described herein, may also refer to standard formulas in spreadsheets, but may be described herein using the provided notation form and syntax for illustration of embodiments. A formula F herein may refer to a range using a range reference ρ, such as F4 or $G$2. Range references differ from ranges at least in that range references can be relative (e.g. B7) or absolute (e.g. $B$7). The use of relative or absolute may be chosen independently for each axis of the reference (e.g. B$7 or $B7).

Relative references are adjusted during copy/paste, e.g., in spreadsheets, while absolute references remain unchanged. The distinction between relative and absolute references is clearly illustrated for copy/paste functions: during formula evaluation, it may be completely ignored. A range reference in corner-size form can always be expressed in corner-corner form. For instance, H$4::{3,1} is equivalent to H$4:H$6. In the other direction, however, a corner-corner range reference cannot always be expressed in corner-size form. For example consider B2:B$6 where the copy-paste behavior of this reference is different to, e.g., B2::{5,1}.

The range on the left-hand side of a range assignment is called a tile, which may be referred to as a set of cells or a cell set herein. In embodiments, tiles are non-overlapping, such that each cell is defined only once. A range assignment r=F means "put formula F into the top left-hand corner of range r, and then copy/paste to assign a formula to the other cells in r." Continuing with the example above for the defined "SHOP" function, i.e., Function 4, which includes G4:G6=F4*$G$2, the cell G4 gets the original formula denoted as F4*$G$2, while G6 will get the formula F6*$G$2, as adjusted by the copy/paste operation.

Generally, when a formula is copy/pasted from a first cell to a second cell, the relative references are adjusted by the offset between the first cell and the second cell, while the absolute references are unchanged. One advantage of the introduced range-assignment notation for the embodiments herein, as compared to standard copy/paste grid operations, is that the range-assignment notation makes explicit that the entire range shares a single master formula.

Extending the notation form and syntax provided herein for embodiments, specifically to SDFs, the "SHOP" function (Function 4) can be re-written as shown in Function 5 below:

```
function SHOP( F4::{3,1}, G2 ) returns H7 {
    G4::{3,1} = F4 * $G$2
    H4::{3,1} = F4 + G4
    H7 = SUM(H4::{3,1})
}.                                              (Function 5)
```

Generally, as described herein, an SDF definition F consists of a function name, a list of input ranges, an output range, and a set of range assignments that make up the SDF body. The body tiles or cell sets of an SDF are the left-hand-sides of its range assignments, and the input tiles or cell sets are the input ranges of the SDF. Each body tile may have a single formula, e.g., the right-hand side of the range assignment. The body tiles may be written in any order, according to embodiments.

The semantics of an example function call F(e1,e2) to a sheet-defined function F is to evaluate the arguments to values v1 and v2, generate a new, temporary spreadsheet containing the range assignments in the body of function F, initialize the input ranges with the argument values v1 and v2, calculate the value of each cell on the sheet (respecting dependencies), and return the value of the output range while discarding the temporary sheet. Unlike conventional languages, where the parameters of the function are arbitrary names given to the input values, in the notation form and syntax herein the input ranges specify the cell(s) in which the arguments to the function are placed, and the output range specifies the cell(s) whose computed value is the result of the function. In the example of the SHOP function above in Function 5, the first argument to SHOP is placed in F4::{3,1}, while the second is placed in G2.

In some embodiments, generalization may be performed for SDFs that are tame, meaning that they have the following properties. For instance, the SDF is static meaning that the range references that appear in a formula identify all the cells that are needed to evaluate the formula. As an example, a spreadsheet call, such as a call in Excel® from Microsoft Corporation of Redmond, WA, for INDIRECT("A2" & "3") first computes the string "A23", and then treats it as a cell reference A23, so any use of INDIRECT makes a formula non-static. The Excel® function OFFSET is similar, however, functions like INDEX and VLOOKUP may be inherently static.

Additionally, for these cases, the SDF is closed meaning that each range reference in the body of the SDF, evaluated in each cell of the tile in which it appears, results in a range of non-negative height and width, and every cell in this range is inside one of the tiles of the SDF. Likewise, the output range has non-negative height and width, and every cell in it is inside one of the tiles of the SDF. For example, consider the exemplary tile noted above for F4::{3,1}=SUM (H4:J4). When copy/pasted into F5, the formula SUM(H4:J4) becomes SUM(H5:J5), and similarly for F6. Each cell in each of these ranges must be defined by some tile of the SDF.

Still further, for these cases, the SDF is non-introspective. That is, the SDF contains no occurrences of functions, e.g., ROW or COLUMN, that implicitly inspect the location of the formula in which they appear. Moreover, the SDF is non-degenerate such that each tile has positive height and width, and each range reference evaluates to a range of positive height and width for at least one cell of the calling tile.

By applying these restrictions to various embodiments, the described elastic SDFs avoid corner cases that can result in variable overlap or conflicts, as well as errors in computing, without excluding useful functions that may be generalized into SDFs.

As described for the embodiments herein, generalization provides the ability to elasticize one or more of the tiles of an SDF in order to generate an elastic SDF. For generalization, tiles/cell sets may be named to make explicit the tiles on to which each reference points, producing a labelled SDF (e.g., $\hat{F}$) as shown below for Function 6:

```
function SHOP( t1 F4::{3,1}, t2 G2 ) returns H7^{t5} {
    t3 G4::{3,1} = F4^{t1} * $G$2^{t2}
    t4 H4::{3,1} = F4^{t1} + G4^{t3}
    t5 H7 = SUM(H4::{3,1}^{t4})
}.                                              (Function 6)
```

As shown, each tile/cell set may be given a distinct name, t1, t2, . . ., etc., including the input tiles/cell sets. For each reference at the right-hand sides, and in the returns clause, the explicit tile(s) to which that reference points is denoted, using a superscript, to show the target tiles of the reference. A reference points to a target tile t if evaluating the reference would read a cell from tile t. For example, the reference $G4^{t3}$ in Function 6 for tile t4 is labelled with target tile t3, because evaluating G4 would require the value of cell G4 which is in tile t3. The calling tile of a reference is the body tile in whose formula that reference appears, as for example, the calling tile of the reference $F4^{t1}$ appearing in the second range assignment is t4. In the SHOP function example, each reference has a unique target tile, but generally, and in embodiments, the label may be a finite set of target tiles. For instance, consider if the final line of the SHOP function was instead t5 H7=SUM(G4::{3,2}$^{t3, \, t4}$), then in this illustrative example, the reference G4::{3,2} covers both tiles t3 and t4, and would be so labelled.

In embodiments, labelling the original SDF with a new name for each tile/cell set, and then computing the unique set of target tiles/cell sets, for each reference, may be a first automatic step in the generalization process described herein.

In embodiments, various steps may be performed to generate and/or execute an elastic SDF, including but not limited to, labelling as noted above, generalization, and/or code generation. Labelling may include constructing a labelled form $\hat{F}$ of F which may be unique up to the renaming of tiles in the context of inelastic SDFs. Generalization may include generalizing the labelled SDF $\hat{F}$ to an elastic SDF $\tilde{F}$. Code generation may include transforming the elastic SDF $\tilde{F}$ to executable form, which may be performed in a variety of ways, as described herein.

As an example, consider the function SHOP shown above as Function 6 in which this function has been annotated with labels for its tiles/cell sets. The annotated function may then be generalized to an exemplary elastic SDF, as:

```
function SHOP<α>( t1 F4::{α,1}, t2 G2 ) returns H7^{t5} {
    t3 G4::{α,1} = F4^{t1} * $G$2^{t2}
    t4 H4::{α,1} = F4^{t1} + G4^{t3}
    t5 H7 = SUM(H4::{α,1}^{t4} )
}.                                              (Function 7)
```

In Function 7, a length variable, α, is introduced which stands for the variable length of the input vector of tile t1. A length variable may take any non-negative integer value, according to embodiments. The size of the input range is thus $\{\alpha,1\}$, and the intermediate ranges rooted at G4 and H4 share this same size (while in some embodiments where ranges are desired to be nonempty, their sizes may be set to $\{\alpha+1,1\}$). Accordingly, if $\alpha$ is instantiated to 3, the labelled SDF in Function 6 is recovered exactly. It should be noted that the tile labels are unaffected by such generalization.

It should be noted that an elastic SDF as described herein has a direct execution semantics, which may require extensions to a standard spreadsheet interpreter. Thus, the elastic SDF may be translated into a form that better allows for direct execution as provided in further detail below for using multiple worksheets, using coordinate arithmetic to avoid tile overlaps, or using array-level operations instead of element-level operators. In continuation of the function above, the second of these alternatives, using overlap avoidance, is exemplarily presented as:

```
function SHOP<α>( F4::{α,1}, G2 ) returns H7{4+α,1} {
    G4::{α,1} = F4 * $G$2
    H4::{α,1} = F4 + G4
    H7{4+α,1} = SUM(H4::{α,1})
}.                                                  (Function 8)
```

It should be noted here for Function 8 that in this example there is no overlap of tiles because $H\{4+\alpha\}$ moves down as the length variable $\alpha$ increases (or up as $\alpha$ decreases) for different input vector sizes. That is, the result in cell $H\{4+\alpha\}$ moves (as $\alpha$ changes) to avoid overlap with the preceding tile.

As noted, elasticity requires generalizations for the syntax of the notation form introduced. In embodiments, this may be accomplished by allowing coordinates to be computed based on the length variables of the function. Such syntax is given above in Table 1. Simply put, span sizes l, column names N, and row numbers m are redefined to include the ability to add a length variable (shown as enclosed in curly braces, e.g., $\{4+\alpha\}$). In embodiments, adding a linear combination of length variables may be used, although such combinations may not occur in the principal regular generalization of an SDF as described below, thus in other embodiments, linear combinations are disallowed to improve robustness of generalizations and efficiency for calculations by removing possibilities where the intervening definitions (e.g., determinability) do not seamlessly fit with linear combinations. In some cases this disallowing may lead to some range references that are grammatical in corner-corner notation but not corner-size notation and vice versa, but these range references will fail to be unambiguous, and thus their impact in the notation form can be ignored.

In the SHOP function example of Function 8 above, in the tile shown for the operation $H\{4+\alpha\} = SUM(H4::\{\alpha, 1\})$, the left-hand side shows an elastic row number $H\{4+\alpha\}$, and a range reference with an elastic size H4:: $\{\alpha, 1\}$. The curly braces may be merged when the coordinate is a constant, or when it appears as a span size. Accordingly, H4::$\{\alpha, 1\}$ is provided instead of H4::$\{\{\alpha\}, 1\}$.

With regard to semantics, an elastic SDF has a direct execution semantics. Simple cases initially appear straightforward, e.g., to evaluate a call SHOP(e1, e2) first e1 and e2 are evaluated to values v1 and v2, then the body of SHOP is instantiated with $\alpha$ equal to the number of rows in v1, and then the value of the return range is computed using ordinary spreadsheet semantics. However, there is a challenge presented for even such simple cases, to wit: if $\alpha>3$, then the ranges of tiles t4 and t5 overlap. From a semantic point of view, the embodiments herein solve this problem by using the tile/cell set that labels each reference. For instance, during evaluation, when dereferencing $H7^{t5}$ in the returns position, the value computed in H7 by tile t5 is used, ignoring any value for H7 by tile t4, using the label attached to a reference $H7^{t5}$ to disambiguate which defining tile/cell set is intended. More formally, in this semantics approach, each cell has three coordinates: row, column, and tile. During evaluation of a function or formula, the evaluator may need to dereference a reference, such as $A3^{ts, tx}$. It does so by looking up cell A3 in both the target tiles ts and tx. In embodiments, only one of these tiles may define A3, and the value of that cell is taken as the value of the reference. Thus, this semantics says what an elastic SDF means and may be used as the basis of an actual implementation, although several other alternative implementations are outlined below.

In embodiments, a "well-defined" elastic SDFs may be used. For example, not every syntactically-correct elastic SDF as described herein is well-defined according to the provided semantics above. In particular, two main issues may occur.

First, to be fully defined and unambiguous, the semantics requires that when evaluating a reference there should be a unique tile among the target-tile set labelling the reference that defines the referenced cell. For example, consider a tile t1 C4::$\{7,1\}=A4^{tx}-A3^{ts, tx}$. When evaluating the reference $A3^{ts, tx}$, embodiments may require a unique tile among ts, tx that defines A3 to be utilized. Moreover, the same property may be required in embodiments to hold for each instance of this formula copy-pasted into the range C4::$\{7,1\}$. For instance, in cell C10 a reference to $A9^{ts, tx}$ will be evaluated, and this too may be required to be defined by exactly one of the tiles ts, tx. Restricting some embodiments to unambiguous elastic SDFs eliminates many bogus generalizations. For example, consider an ambiguous SDF representation for the SHOP function given as:

```
function SHOP<α>( t1 F4::{α,1}, t2 G2 ) returns H{4+α} {
    t3 G4::{α,1} = F4^t1 * $G$2^t2
    t4 H4::{3,1} = F4^t1 + G4^t3  /* Bogus */
    t5 H{4+α} = SUM(H4::{α,1})
}.                                                  (Function 9)
```

As shown, the operation for t4 H4::$\{3,1\}=F4^{t1}+G4^{t3}$ is problematic. One issue here is that tile t4 does not resize with its inputs t1 and t3. Consequently, if $\alpha<3$, the operation for t4 tries to read from at least one undefined cell, while if $\alpha>3$, the same is true of the operation for t5.

Second, to have a well-defined semantics according to some embodiments, an elastic SDF may not mention length variables that are not fixed by the inputs. For example:

```
function NONDET(A1::{α,1}) returns B1 {
    C1::{β,1} = ...
    B1 = SUM( C1::{β,1} )
}.                                                  (Function 10)
```

Here $\beta$ is not determined by the size of any of the input parameters, so it is hard to see how to execute the SDF. These considerations motivate the definition of what it means for an elastic SDF to be well-defined.

Thus, a well-defined elastic SDF is an elastic SDF $\mathcal{F}$ that is unambiguous, meaning that for every assignment of values to the length variables, (a) all tiles have non-negative height and width, (b) no two tiles in the target-tile set of the same reference overlap, and (c) for every labelled range reference $\tilde{\rho}=\overline{\rho}^{t1,\ldots,tk}$ appearing in a calling tile tc of $\tilde{\mathcal{F}}$, and with respect to every cell in tc, the reference $\tilde{\rho}$ evaluates to a range of non-negative height and width that is covered by the tiles t1, . . . , tk. Further, a well-defined elastic SDF is an elastic SDF $\tilde{\mathcal{F}}$ that is determinable such that all its length variables are uniquely determined by the sizes of its arguments.

Additionally, an elastic SDF $\tilde{\mathcal{F}}$ is a regular generalization of a labelled SDF $\hat{F}$ if it is a semi-regular generalization of $\hat{F}$ and each range reference $\tilde{\rho}$ in $\tilde{\mathcal{F}}$ is well-behaved (further details of which are provided in a subsequent section below). An elastic SDF $\tilde{\mathcal{F}}$ is a semi-regular generalization of a labelled SDF $\hat{F}$ if (1) $\tilde{\mathcal{F}}$ is a generalization of $\hat{F}$, (2) every tile of $\tilde{\mathcal{F}}$ has non-negative height and width for every assignment of values to the length variables, (3) the upper-left corner of each tile of $\tilde{\mathcal{F}}$ is constant, and (4) every tile of non-constant height in $\tilde{\mathcal{F}}$ has height at least 2 in $\hat{F}$, and likewise for the width. An elastic SDF $\tilde{\mathcal{F}}*$ is the principal regular generalization of $\hat{F}$ if it is a regular generalization of $\hat{F}$ and is more general than every other regular generalization $\tilde{\mathcal{F}}'$ of $\hat{F}$. $\tilde{\mathcal{F}}*$ is more general than every other regular generalization $\tilde{\mathcal{F}}'$ of $\hat{F}$ if there exists a length substitution that converts $\tilde{\mathcal{F}}*$ to $\tilde{\mathcal{F}}'$ (ignoring the length variable declarations themselves). The principal regular generalization will be unique up to renaming of length variables as well as addition and removal of unused length variables (because regularity does not require determinability), but in embodiments such lack of uniqueness may be ignored and assumed as if it were unique for practical purposes.

In other words, the embodiments disclosed herein provide for generation and execution of elastic sheet-defined functions and arrays. These and further embodiments are described in greater detail as follows.

B. Embodiments for Generation of Elastic SDFs

Systems and apparatuses may be configured in various ways to perform their functions for generation and execution of elastic sheet-defined functions and arrays. For example, the embodiments herein provide for systems and methods to generalize an SDF F to an appropriate elastic SDF $\tilde{\mathcal{F}}$. In embodiments, various steps may be performed to generate and/or execute an elastic SDF, including but not limited to, labelling, generalization, and/or code generation, as described herein.

FIG. 2 is a block diagram of a system 200 configured for generation and execution of elastic sheet-defined functions and arrays. System 200 is described as follows.

System 200 includes a computing device 202, which may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a generalization manager 208. System 200 may also include one or more databases (DB(s)) 222 and one or more applications 224. System 200 may also include additional components (not shown for brevity and illustrative clarity) including, but not limited to, components and sub-components of other devices and/or systems herein, as well as those described below with respect to FIGS. 10 and 11, such as an operating system.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of generalization manager 208, which may be implemented as computer program instructions for generation and execution of elastic sheet-defined functions and arrays, etc., as described herein. Memory 206 is configured to store such computer program instructions/code, as well as to store other information and data described in this disclosure.

Network interface 226 may be any type or number of wired and/or wireless network adapter, modem, etc., configured to enable system 200 to communicate with other devices over a network, such as communications between system 200 and other devices utilized in a network, such as computing devices of developers, publishers, sellers, etc., of application(s) 224.

Application(s) 224 may be any type of software applications, including but without limitation, spreadsheet programs, software development applications, and/or the like. Application(s) 224 may include user interfaces (UI(s)) (not shown) through which uses interact with application(s) 224 to generate or execute elastic SDFs. Application(s) 224 may also include one or more controls 228 that comprise selectable buttons, menu options, keyboard strokes, etc. Controls 228 may be activated by a user or automatically to perform different operations herein such as, but not limited to, initiating the generation of an elastic SDF from an inelastic function, executing an elastic SDF, and/or the like. DBs 222 may include one or more DBs by which SDFs and/or elastic SDFs for application(s) 224 are organized/stored.

Generalization manager 208 includes a plurality of components for performing the functions and operations described herein for generation and execution of elastic sheet-defined functions and arrays. As shown, generalization manager 208 includes an elasticity manager 210, a constraints manager 212, an execution manager 214, and a range determiner 216. Accordingly, generalization manager 208 may operate in various ways to enable generation and execution of elastic sheet-defined functions and arrays. That is, system 200 and generalization manager 208 are configured to find the principal regular generalization of SDFs, and its proof of correctness, which are parameterized over the definition of well-behavedness through the generation of constraints and their principle solutions. In subsequent description, a simple definition of well-behavedness and a more expressive, and complicated definition are further detailed.

In embodiments, a generalization system such as system 200 may include one or more of a class of supported SDFs and a subset of labelled SDFs as described herein, a predicate for well-behaved range references in supported SDFs, and/or a constraint generator that takes a range reference in the "master" elastic SDF $\hat{\mathcal{F}}_0$ (defined below) generated from a supported SDF and returns a set of constraints.

While shown separately for illustrative clarity, in embodiments, one or more of elasticity manager 210, constraints manager 212, execution manager 214, and range determiner 216, may be combined together and/or as a part of other components of system 200. In some embodiments, less than all of the components of generalization manager 208 illustrated in FIG. 2 may be included. In software implementations, one or more components of generalization manager 208 may be stored in memory 206 and are executable by processor 204.

Elasticity manager 210 may be configured to convert tile/cell set ranges of $\hat{F}$ to corner-size notation and all range references to corner-corner notation, including expanding single cell references to pairs of identical corners. Elasticity manager 210 may also be configured to generate the "master" elastic version $\hat{\mathcal{F}}_0$ of $\hat{F}$ by adding a fresh delta variable $\hat{\alpha}$ instance to the height and width of each tile/cell set, and to each row and/or column reference. It should be noted that setting all the delta variables instances to zero recovers the original function $\hat{F}$, and that unlike length variables, delta variables can potentially take negative values. Elasticity manager 210 may be further configured to apply a delta substitution $\Theta^*$ (determined by constraints manager 212 and described below) to $\hat{\mathcal{F}}_0$ generate or produce the principal regular generalization $\hat{\mathcal{F}}^*$ of $\hat{F}$.

Constraints manager 212 may be configured to generate a set of constraints on the delta variable $\hat{\alpha}$ instances in the syntax form provided herein, including: (a) for each tile/cell set, if the height and/or width is one in $\hat{F}$, constrain the height delta variable instance equal to zero, otherwise constrain the height and/or width to be non-negative; and (b) activate the constraint generator on each range reference $\tilde{\rho}$ in $\hat{\mathcal{F}}_0$. Constraints manager 212 may also be configured to determine the principal solution of the constraints, i.e., the delta substitution $\Theta^*$, that maps every delta variable instance either to zero or to $\alpha+\hat{1}$ where $\alpha$ is the length variable.

Range determiner 216 may be configured to determine the size of input ranges for vectors during execution of elastic SDFs. For example, elastic SDFs as described herein may be configured to take input vectors of any size, regardless of what parameters are specified for functions defined by users, and range determiner 216 may determine sizes based on the input vectors in the calls to elastic SDFs.

Execution manager 214 may be configured to receive calls for execution of elastic SDFs and to generate instances thereof. In generating instances of elastic SDFs may utilize the ranges determined by range determiner 216, separate sheets or other data structures, and/or array-in-cell substitutions to prevent overlaps. Execution manager 214 may also be configured to execute operations of the generated instances of the elastic SDFs.

Additional details regarding generalization manager 208 and its components are provided below.

For instance, FIG. 3 shows a flowchart 300 for generation and execution of elastic sheet-defined functions and arrays, according to an example embodiment. Generalization manager 208 may operate according to flowchart 300. Further structural and operational examples will be apparent to persons skilled in the relevant art(s) based on the following description. Flowchart 300 is described as follows with respect to system 200 of FIG. 2.

Flowchart 300 begins at step 302. In step 302, a predefined function having a fixed input is received. For example, generalization manager 208 may receive a predefined function from, e.g., an application of applications 224, where the function has a fixed input parameter, such as shown in defined function 102 of FIG. 1. The function may be an SDF defined by a user of the application, in embodiments, where the user desires to convert the predefined function to an elastic SDF. In some embodiments, the application may include a selectable menu option or button that begins the conversion process by providing the predefined function to generalization manager 208 to generate the elastic SDF.

In step 304, the fixed input is converted to a variable input to generate an elastic function. For instance, elasticity manager 210 and constraints manager 212 of generalization manager 208 may be configured to convert the fixed input to a variable input to generate the elastic function. To convert that fixed input, elasticity manager 210 may be configured to generate notations for, and introduce delta variables into, the predefined function. Constraints manager 212 may include a generator (not shown for brevity) that is configured to generate constraints for instances of the delta variables to allow elasticity manager 210 to generate a constraints solution on which the variable input is based. The elastic function, e.g., an elastic SDF, is generated having the variable input such that the elastic function is configured to take inputs that are of a different size than the fixed input.

Additional details regarding the generation of elastic SDFs are provided below. For example, FIG. 4 shows a flowchart 400 for generation and execution of elastic sheet-defined functions and arrays, according to an example embodiment. Generalization manager 208 may operate according to flowchart 400, in an embodiment. Flowchart 400 may be an embodiment of flowchart 300 of FIG. 3. Further structural and operational examples will be apparent to persons skilled in the relevant art(s) based on the following description. Flowchart 400 is described as follows with respect to system 200 of FIG. 2, and with respect to the SHOP function example provided above (e.g., as in Function 4 where tile labels are already applied as illustrated in Function 6).

Flowchart 400 begins at step 402. In step 402, a corner-size notation of a range of a first cell set, that has at least one cell, of the inelastic function is generated. For instance, elasticity code 210 may be configured to generate the corner-size notation for a range of the first cell set of the inelastic function, e.g., a tile. As described herein, a corner-size notation is denoted by a cell address and a size, such as: H4::{3,1} for a range H4:H6. It should be noted in embodiments that more than one range for the inelastic function, including each range, may have a corner-size notation generated therefor.

In step 404, a corner-corner notation of a range reference of a second cell set of the inelastic function is generated. For instance, elasticity code 210 may be configured to generate the corner-corner notation for a range reference of a second cell set (e.g., a tile) of the inelastic function, the range reference being included in an operation of the inelastic function. As an example, the range reference $G$2 may have a generated corner-corner notation of $G$2:$G$2. It should be noted in embodiments that more than one range reference for the inelastic function, including each range reference, may have a corner-corner notation generated therefor. Subsequent to the initial conversions of step 402 and step 404, the SHOP function is represented as:

```
function SHOP( t1 F4::{3,1}, t2 G2::{1,1})returns H7:H7^{r5} {
    t3 G4::{3,1} = F4:F4^{r1} * $G$2:$G$2^{r2}
    t4 H4::{3,1} = F4:F4^{r1} + G4:G4^{r3}
    t5 H7::{1,1} = SUM(H4:H6^{r4} )
}.                                           (Function 11)
```

In step 406, a size identifier of the first cell set that is an input having a fixed range size for a predefined function is modified with a first delta variable, and a cell identifier of a range reference of the second cell set is modified with a second delta variable. In embodiments, a height or a width may be modified with a first instance of a delta variable for the first cell set. The modification may be based on the corner-size notation. Likewise, a cell identifier may be modified with a second instance of the delta variable for the range reference of the second cell set, which may be based on the corner-corner notation. As an example, elasticity manager 210 may be configured to modify size identifiers, e.g., heights and widths, associated with corner-size notations as well as identifiers of corner-corner notations with instances of delta variables. As shown above, generally, e.g., in Function 7, a length variable $\alpha$ may be utilized during generalization. Delta variable instances ($\hat{\alpha}$) may modify heights, widths, and cell identifiers as placeholders for length variables $\alpha$. That is, the steps below for constraints and solutions thereof may determine which parameters of an SDF are to be provided with length variables $\alpha$, and the assignment of delta variable instances $\hat{\alpha}$ are utilized for such determinations.

The master elastic SDF $\mathcal{F}_0$ for Function 11 above (with omitted instances of delta variables not shown for brevity and illustrative clarity) may be provided as:

```
function SHOP(t1 F4::{3+ α̂₁,1}, t2 G2::{1+ α̂₂,1}) returns H{7+ α̂₃}:H{7+ α̂₄}^{r5} {
    t3 G4::{3+ α̂₅,1} = F{4+ α̂₆}:F{4+ α̂₇}^{r1} * $G${2+ α̂₈}:$G${2+ α̂₉}^{r2}
    t4 H4::{3+ α̂₁₀,1} = F{4+ α̂₁₁}:F{4+ α̂₁₂}^{r1} + G{4+ α̂₁₃}:G{4+ α̂₁₄}^{r3}
    t5 H7::{1+ α̂₁₅,1} = SUM(H{4+ α̂₁₆}:H{6+ α̂₁₇}^{r4} )
}.                                                          (Function 12)
```

Here it should be noted that only the size of each tile/cell set is elasticized but not the position.

In step 407, a value limit is set for the first delta variable and the second delta variable based on the fixed range size. Constraints manager 212 may be configured to perform step 407. That is, constraints manager 212 may be configured to constrain delta variables such that their values are limited to be greater than or equal to, or equal to, zero according to the specific notation for their associated tile/cell set. In embodiments, step 407 may comprise one or more of step 408, step 410, and/or step 412 described below.

In step 408, a delta variable constraint is generated. For example, constraints manager 212 may be configured to generate constraints for delta variable instances. The types of constraints generated may be based on, or determined by, the size of input vectors for the elastic SDF. For instance, in the SHOP function example noted above in Function 12, there are two input vectors at F4 and G2. The constraint for the input vector at F4 may be generated with a constraint such that $3+\hat{\alpha_1}$ is greater than or equal to zero because the predefined function of SHOP has an input vector size of 3 and the input vector size in the elastic SHOP function must be nonnegative according to embodiments, while the input vector at G2 has a size of one and thus the constraint for $\hat{\alpha_2}$ may be generated as zero according to the definition of semi-regularity. Further details regarding step 408 according to an embodiment are described below in flowchart 600 of FIG. 6.

In step 410, the delta variable constraint is applied to at least one of the first delta variable or the second delta variable. For instance, constraints manager 212 may be configured to apply constraints to appropriate delta variable instances in preparation for solving for a constraints solution. Ranges/references within operations for the input vector at F4 may be assigned a corresponding constraint generated in step 408, while ranges/references within operations for the input vector at G2 may be assigned a different corresponding constraint as generated in step 408. Applying the constraints generated in step 408, based on Function 12 above, is illustrated as:

function SHOP(t1 F4::{3+ $\hat{\alpha_1}$,1} $^{[3+\hat{\alpha}1\,=0]}$, t2 G2::{1+ $\hat{\alpha_2}$,1} $^{[\hat{\alpha}2=0]}$)
    returns H{7+ $\hat{\alpha_3}$}:H{7+ $\hat{\alpha_4}$}$^{r5}$ $^{[(c)\hat{\alpha}1\,5-\hat{\alpha}3-\hat{\alpha}4=0]}${
  t3 G4::{3+ $\hat{\alpha_5}$,1}$^{[3+\hat{\alpha}5=0]}$ = F{4+ $\alpha_6$}:F{4+ $\hat{\alpha_7}$}$^{r1}$ $^{[(a)\hat{\alpha}1-\hat{\alpha}5,\,\hat{\alpha}6-\hat{\alpha}7=0]}$
    * $G${2+$\hat{\alpha_8}$}:$G${2+$\hat{\alpha_9}$}$^{r2}$ $^{[(c)\hat{\alpha}2-\hat{\alpha}8-\hat{\alpha}9=0]}$
  t4 H4::{3+ $\hat{\alpha_{10}}$,1}$^{[3+\hat{\alpha}10=0]}$ = F{4+ $\hat{\alpha_{11}}$}:F{4+ $\hat{\alpha_{12}}$}$^{r1}$ $^{[(a)\hat{\alpha}1-\hat{\alpha}10,\,\hat{\alpha}11-\hat{\alpha}12=0]}$
    + G{4+ $\hat{\alpha_{13}}$}:G{4+ $\hat{\alpha_{14}}$}$^{r3}$ $^{[(a)\hat{\alpha}5-\hat{\alpha}10,\,\hat{\alpha}13-\hat{\alpha}14=0]}$
  t5 H7::{1+ $\hat{\alpha_{15}}$,1}$^{[\hat{\alpha}15=0]}$ = SUM(H{4+ $\hat{\alpha_{16}}$}:H{6+ $\hat{\alpha_{17}}$}$^{r4}$ $^{[(b)\hat{\alpha}16=0,\,\hat{\alpha}17-\hat{\alpha}10]}$)
}.

(Function 13)

As shown in Function 13 for $\mathcal{F}_0$, each constraint is attached to the part of $\mathcal{F}_0$ that it was generated from and marked with a step of the constraint generation procedure that generated it (described in further detail below), while unmarked constraints are handled for each tile/cell set where if the height was one in $\hat{r}$, then the height delta variable is constrained equal to 0, else the height is constrained to be non-negative (which may be likewise performed with respect to the width).

In step 412, a constraint solution is generated for the delta variable constraint. For instance, constraints manager 212 may be configured to solve for constraints for $\mathcal{F}_0$ that are generated and applied in the prior steps. In embodiments, solving for constraints, i.e., generating a constraint solution, yields a delta substitution Θ* that maps every delta variable instance either to zero or to $\alpha+\hat{1}$ where α is the length variable. Put another way, the solution to a set of constraints is a delta substitution, which maps each delta variable to zero (meaning that the coordinate is inelastic) or to $\alpha+\hat{1}$ (meaning that the coordinate has elastic variable α). In above example for Function 13, solving the constraints yields the delta substitution { $\hat{\alpha_1}$, $\hat{\alpha_5}$, $\hat{\alpha_{10}}$, $\hat{\alpha_{17}}$ }→3, and all other delta variable instances are zero.

In step 414, the elastic function is generated based on the constraint solution, the elastic function configured to take an input range of a size that is different than the inelastic function. For example, elasticity manager 210 may be configured to generate an elastic function such as elastic SDF $\mathcal{F}$, based on the constraints solution from step 412 for $\mathcal{F}_0$, e.g., as exemplarily shown in Function 7 above.

It is contemplated that in embodiments flowchart 400 may also include steps for labeling/annotating a function as described herein.

With respect to constraints solving, more specifically, constraints manager 212 may configured to find the principal (i.e., the most general, up to renaming) substitution that solves the constraints. The syntax of constraints and substitutions is provided below in Table 1.

A delta substitution Θ satisfies a constraint if applying Θ to both sides of the constraint makes the constraint true, assuming that length variables α are held to be non-negative. For example $\hat{\alpha} \to \alpha+3$ satisfies $\hat{\alpha} \geq 3$. A delta substitution $\theta_1$ is more general than $\Theta_2$ if and only if there is a length substitution φ such that $\Theta_2 = \varphi \cdot \Theta_1$. To compute the most general solution of a set of constraints, constraints manager 212 may be configured to perform one or more of the following operations in FIG. 5.

Figure 5:
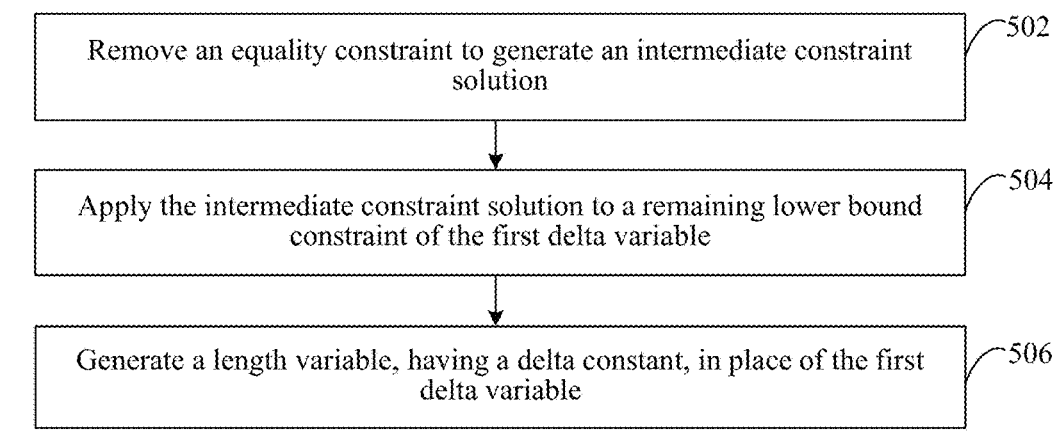
FIG. 5 shows a flowchart for generation of a constraints solution for a constraint, in accordance with an example embodiment.

FIG. 5 shows a flowchart 500 for generation and execution of elastic sheet-defined functions and arrays, according to an example embodiment. Generalization manager 208 and constraints manager 212 may operate according to flowchart 500, in embodiments. Flowchart 500 may be an embodiment of step 412 of FIG. 4. Further structural and operational examples will be apparent to persons skilled in the relevant art(s) based on the following description. Flowchart 500 is described as follows with respect to system 200 of FIG. 2.

Flowchart 500 begins at step 502. In step 502, an equality constraint is removed to generate an intermediate constraint solution. For instance, constraints manager 212 may be configured to remove equality constraints and generate an intermediate constraint solution. Generally, eliminating one to all of the equality constraints may be performed by gathering the equality constraints $\hat{\alpha} = \hat{\beta}$ and $\hat{\alpha} = 0$ into an intermediate substitution θ. This operation thus leaves only lower-bound constraints to be solved.

In step 504, the intermediate constraint solution is applied to a remaining lower bound constraint of the first delta variable. For example, constraints manager 212 may be configured to apply the intermediate constraint solution lower bounds of delta variable instances that are not eliminated in step 502 (i.e., instances of delta variables that have non-equality constraints). In this step, the remaining constraint lower bounds are simplified by applying θ to the lower bound constraints, normalizing them to the form $\hat{\alpha} \geq \hat{1}$, and combining all the constraints on each individual variable by taking the maximum of its lower bounds. This leaves a single constraint $\hat{\alpha} \geq \hat{1}$, for each delta variable $\hat{\alpha}$.

In step 506, a length variable is generated, having a delta constant, in place of the first delta variable. For instance, constraints manager 212 may be configured to generate such length variables. That is, delta variable instances may be replaced with length variables. To do so, constraints manager 212 may, for each constraint $\hat{\alpha} \geq \hat{1}$, generate a fresh length variable $\alpha$, and composed $\theta$ with $\hat{\alpha} \rightarrow \alpha + \hat{1}$.

According to embodiments herein, system 200 and its subcomponents including generalization manager 208, are configured to handle delta variables and instances thereof with lower-bound constraints. In such scenarios, the third operation above for computing the most general solution of a set of constraints (i.e., step 506) would thus provide for eliminating all delta variables in favor of length variables. Hence, the result is a delta substitution $\Theta$, with only length variables in its range.

As a further example of generalization, and constraints generation and solving, the following provides a simplified embodiment for illustration of basic SDFs. This embodiment will be described in the context of the SHOP function example described above. This simplified embodiment supports all basic SDFs.

A tame SDF is "basic" if it has the property that, once it is correctly labelled, the target-tile set on each reference is a singleton. Well-behaved references may be restricted, according to embodiments, to three common kinds described below. In contrast, the more fully described embodiment subsequently described supports all tame SDFs (not only basic ones) and allows additional types of references. It should be noted that every generalization of a basic SDF that is regular according to embodiments is also regular according to the fully described embodiment, but not vice versa. Thus, for certain basic SDFs described here, while the simplified system produces a generalization that is principal according to its own definition of regularity, the full embodiment produces a more general elastic SDF.

As noted above, a well-behavedness condition may be required for embodiments. A well-behavedness condition that entails unambiguity, captures common patterns of computation, and excludes other possible incomparable generalizations may be utilized. The well-behavedness condition is further defined as follows.

With regard to analyzing the structure of references, a range is normally given by a pair of corners and columns that are normally denoted by letters. However, embodiments herein also contemplate ranges as an intersection of a row span and a column span, each with two endpoints that are numeric axis positions (m). Accordingly, the row and column axes may be treated symmetrically. For example, the range F4:G6 is the intersection of the row span 4:6 and the column span 6:7. Likewise, a range reference is an intersection of a row span reference and a column span reference, each of which has two axis position references ($\chi$) that may be absolute or relative. Additionally, $\overline{m}$ and $\overline{\chi}$ denote elastic axis positions and axis position references. A "coordinate" of an axis position reference means the underlying number (or elastic expression) without regard to whether the reference is absolute or relative.

Because each range reference in a basic SDF has only one target tile, for a generalization to be unambiguous, its row span reference is required to stay inside the row span of the target tile, and the endpoints do not flip to produce a negative height, and likewise for the column span reference.

The terms "stable" and "superstable" as applied to references provides that a row reference $\overline{\chi}$ appearing in an operation for a calling tile/cell set tc in an elastic SDF is stable if $\overline{\chi}$ is absolute, or tc is vertically inelastic, or both, while being superstable provides that it is absolute or the height of tc is 1. The analogous definitions apply to column references. Thus, a stable row reference points to a fixed number of different target rows, independent of the values of any length variables, when evaluated across all caller rows, a superstable row reference points to a single target row, and an unstable row reference points to an arbitrary number of target rows depending on the (variable) height of tc.

A range reference $\tilde{\rho}$ appearing in a basic elastic SDF $\tilde{\mathcal{F}}$ is well-behaved if it satisfies the following conditions. For example, where tc is the calling tile/cell set and tt is the (single) target tile/cell set of $\tilde{\rho}$, and $\overline{\chi}1:\overline{\chi}2$ is the row span reference of $\tilde{\rho}$, then $\overline{\chi}1:\overline{\chi}2$ is of one of the following three kinds: inelastic, lockstep, or whole. For inelastic kinds, the height of tt is a constant, $\overline{\chi}1$ and $\overline{\chi}2$ are both stable, and their coordinates are both constant. For lockstep, the heights of tc and tt are the same non-constant expression, $\overline{\chi}1=\overline{\chi}2$, the elastic axis position $\overline{\chi}1$ is relative, and $\overline{\chi}1$ points to the top row of tt when evaluated at the top row of tc. That is, "points to" means that for all values of length variables, not just in $\tilde{F}$, i.e., in this case, the coordinate of $\overline{\chi}1$ must be constant. Regarding kinds that are whole, the height of tt is non-constant, $\overline{\chi}1$ and $\overline{\chi}2$ are superstable, $\overline{\chi}1$ points to the top row of tt, and $\overline{\chi}2$ points to the bottom row of tt. It should be noted that the analogous condition also applies for the column span reference of $\tilde{\rho}$.

Examples of all three kinds of span references appear in the elastic version of SHOP shown in Function 7. For instance, all the column span references of Function 7 are of the inelastic kind, as are the row span references that are part of the references $G$2 in the operation for t3 and H7 in the returns clause. The $2 is stable because it is absolute, and the H7 in the returns clause is implicitly treated as absolute, while all the other references that are endpoints of inelastic spans are stable because the calling tile/cell set has a size of one on the relevant axis. Additionally, the row span reference in SUM(H4::{$\alpha$, 1}), which is SUM(H4:H{3+$\alpha$}) in corner-corner notation, is of the whole kind. The row references are superstable because the calling tile/call set t5 has a height of one. The remaining row span references are of the lockstep kind.

Accordingly, given a span reference $\overline{\sigma}$ in the "master" elastic SDF $\tilde{\mathcal{F}}_0$, a conjunction of constraints can be generated on a delta substitution $\Theta$ that is equivalent to the disjunction of $\Theta(\overline{\sigma})$ being of the allowed kinds of span references noted above. In embodiments, at least one of the lockstep or whole kinds may be eliminated by processing $\tilde{\mathcal{F}}_0$. For example, whole kinds require that the endpoints of $\overline{\sigma}$ be superstable, while lockstep kinds require that they not be. Furthermore, the kinds are such that if whole is eliminated, but not lockstep, generation of a set of constraints equivalent to $\Theta(\overline{\sigma})$ being lockstep or inelastic is accomplished. Likewise, if lockstep but not whole kinds are eliminated, generation of a set of constraints equivalent to $\Theta(\overline{\sigma})$ being whole or inelastic is provided. If both lockstep and whole kinds are eliminated, generation for constraints equivalent to $\Theta(\overline{\sigma})$ being inelastic is provided. Thus, based on $\tilde{\mathcal{F}}_0$, a set of constraints can always be generated that is equivalent to the disjunction of the kinds that have not been eliminated.

Accordingly, the constraint generation procedure for a range reference $\tilde{\rho}$ in $\tilde{\mathcal{F}}_0$ may be provided. Considering tt and tc are the target tile and calling tile of $\tilde{\rho}$, $\overline{\chi}1:\overline{\chi}2$ are its row span reference, $\chi1:\chi2$ are the original row span reference in $\tilde{F}$, $\hat{\alpha}_t$ and $\hat{\alpha}_c$ are the height delta variables of tt and tc, $\hat{\alpha}_1$ and $\hat{\alpha}_2$ be the delta variables of $\overline{\chi}1$ and $\overline{\chi}2$, the following cases, shown as steps in FIG. 6 may be attempted in order.

Figure 6:
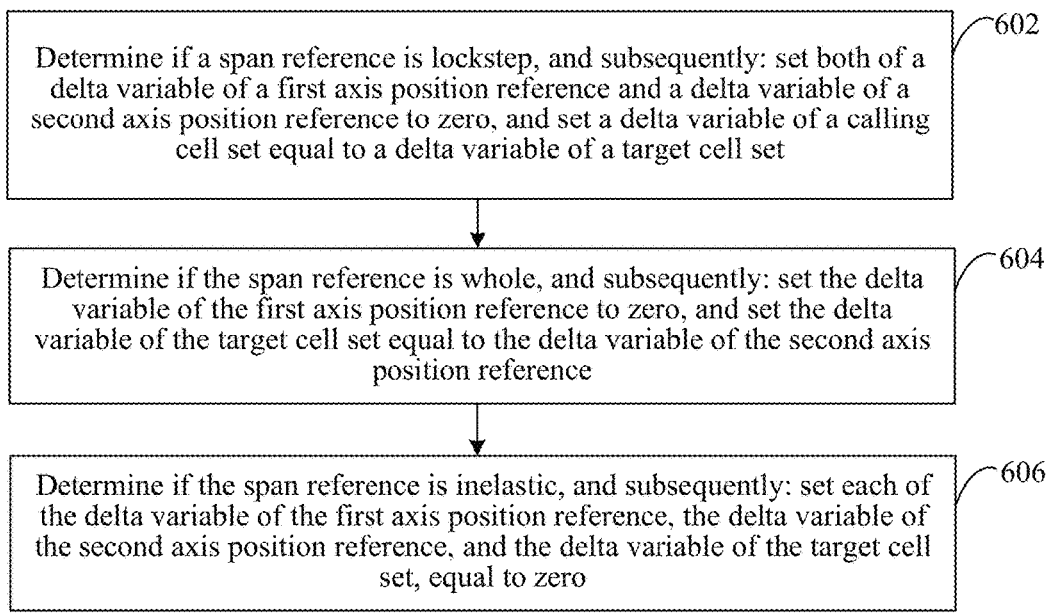
FIG. 6 shows another flowchart for generation of a constraints solution for a constraint, in accordance with an example embodiment.

FIG. 6 shows a flowchart 600 for generation and execution of elastic sheet-defined functions and arrays, according to an example embodiment. Generalization manager 208 and constraints manager 212 may operate according to flowchart 600, in embodiments. Flowchart 600 may be an embodiment of flowchart 300 of FIG. 3, flowchart 400 of FIG. 4, and/or flowchart 500 of FIG. 5. In one embodiment, flowchart 600 may be an embodiment of step 408 of flowchart 400. Further structural and operational examples will be apparent to persons skilled in the relevant art(s) based on the following description. Flowchart 600 is described as follows with respect to system 200 of FIG. 2.

Flowchart 600 begins at step 602. In step 602, it is determined if a span reference is lockstep, and subsequently both of a delta variable of a first axis position reference and a delta variable of a second axis position reference are set to zero, and a delta variable of a calling cell set is set equal to a delta variable of a target cell set. First, for lockstep kinds (a), if $\chi 1 = \chi 2$, $\chi 1$ is relative, and tt and tc have the same initial height (of at least 2), then this span reference may be initially classified as lockstep by constraints manager 212, but it may turn out to be inelastic. Thus, constraints manager 212 may be configured to constrain $\hat{\alpha_1} = \hat{\alpha_c}$ and $\hat{\alpha_1} = \hat{\alpha_2} = 0$.

In step 604, it is determined if the span reference is whole, and subsequently the delta variable of the first axis position reference is set to zero, and the delta variable of the target cell set is set equal to the delta variable of the second axis position reference. If the determination of step 602 is found to be otherwise than the stated stipulation, next, for whole kinds (b), if the initial height of tt is at least 2, $\chi 1$ and $\chi 2$ are both superstable, $\chi 1$ points to the top row of tt in $\hat{r}$, and $\chi 2$ points to the bottom row of tt in $\hat{r}$, then this span reference may be initially classified as whole by constraints manager 212, but it may turn out to be inelastic. Thus, the system may constrain $\hat{\alpha_1} = 0$ and $\hat{\alpha_2} = \hat{\alpha_1}$.

In step 606, it is determined if the span reference is inelastic, and subsequently each of the delta variable of the first axis position reference, the delta variable of the second axis position reference, and the delta variable of the target cell set, is set equal to zero. If the determination of step 604 is found to be otherwise than the stated stipulation, next, for inelastic kinds (c), the span reference is classified as inelastic by constraints manager 212, therefore constraints manager 212 may be configured to constrain $\hat{\alpha_1} = \hat{\alpha_1} = \hat{\alpha_2} = 0$. In addition, if either $\chi 1$ or $\chi 2$ is a relative reference, constraints manager 212 may be configured to constrain $\hat{\alpha_c} = 0$ to ensure that $\chi 1$ and $\chi 2$ will be stable.

These steps may also be analogously applied for the column axis. An example of the resulting output of this procedure is shown in Function 13 above.

The simplified generalization embodiments immediately above may be applied for basic SDFs as noted, in which each range reference has only one target tile/cell set. In practice, however, more complex, non-basic SDFs may be utilized. In the context of the full embodiment for generalization mentioned above, provided below is an example function with predetermined input sizes that computes the post-transaction balances of a bank account with interest compounded daily: a function COMPOUND that takes as inputs vectors for start date, opening balance, interest rate, and transactions, and for which transactions is a 2-column array of (date, amount) pairs. This function may be shown as Function 14:

```
function COMPOUND( ts A3, to F3, tr F1, tx A4::{7,2} ) returns F4::{7,1}^{r4} {
    t1 C4::{7,1} = A4^{tx} – A3^{ts,α}           /* Interval between transactions */
    t2 D4::{7,1} = POWER(1+$F$1^{tr}, C4^{t1})    /* Interest multiplier for interval */
    t3 E4::{7,1} = F3^{to,r4} * D4^{t2}           /* New balance after interest */
    t4 F4::{7,1} = E4^{t3} + B4^{tx}              /* Final balance after transaction */
}.
```
(Function 14)

Function 14 computes each new balance by adding a suitable interest payment (which depends on the date interval) and the transaction amount, and returns an array of the post-transaction balances. It should be noted that in this example, the start date in A3 is placed immediately above the column of transaction dates in A4:A10, so that a uniform computation of the intervals during which interest accrues may be determined. Now considering the reference to A3 in the definition of t1, when computed in cell C4, the reference A3 points to the start date input tile ts, however, when computed in cell C5, A3 has become A4 (via copy/paste), and hence points to the date on the first transaction, in tile tx. Thus, this reference to A3 has more than one (e.g., here, two) target tiles/cell sets, ts and tx, and is therefore labelled with both, making it a non-basic SDF.

The fully described generalization system, however, is configured to handle arbitrary tame SDFs, while still utilizing principal generalizations. Accordingly, systems and methods herein are configured to provide for relative references with an upward offset between tiles/cell sets of similar height, whether or not the tiles/cell sets start at the same row. For example, if $\bar{r}1$ and $\bar{r}2$ are tiles of size $\{\alpha, 1\}$ (or possibly the same tile) and $\bar{r}1$ contains a relative reference to $\bar{r}2$, then it may be the case that the second row of $\bar{r}1$ points to the first row of $\bar{r}2$, the third row of $\bar{r}1$ to the second row of $\bar{r}2$, and so forth. The first row of $\bar{r}1$ points to a separate, vertically-inelastic tile located immediately above $\bar{r}2$, such as tiles ts and to in the COMPOUND function example. Analogous application to leftward offsets may also be performed. Computations with downward and rightward offsets may, in some cases, be expressed in embodiments by using an absolute reference to the entire target tile and then using an INDEX function, or equivalent, to extract the desired element(s).

The regularity condition that the upper-left corner of each tile be constant makes it possible to position an inelastic tile immediately above or to the left of an elastic tile to fulfill a reference with an upward or leftward offset, but may not make it possible to position an inelastic tile below or to the right of an elastic tile to support a downward or rightward offset, because in the latter case, the upper-left corner of the inelastic tile would depend on the size of the elastic tile.

In addition to adding support for upward and leftward offsets (e.g., as relevant to references with multiple target tiles), the embodiments herein also add support for cumulative aggregation. For example, a cumulative summation function given as:

```
function CUMSUM(t1 A1::{3,1}) returns B1::{3,1}^{r2} {
    t2 B1::{3,1} = SUM(A$1:A1^{t1})
}.
```
(Function 14)

may be generalized to an elastic SDF as:

```
function CUMSUM⟨α⟩ (t1 A1::{α, 1}) returns B1::{α, 1}^{r2} {
    t2 B1::{α, 1} = SUM(A$1:A1^{r1})
}.                                                    (Function 15)
```

To do so, embodiments beyond the three kinds of span references in the simplified embodiments above are provided here which allow each endpoint of a span reference to independently fall into one of four kinds: inelastic, lockstep, start, and end. The row reference in the operation for t2 has one start kind endpoint and one lockstep kind endpoint. In the simplified embodiment, the only kind of row span reference that could contain an unstable row reference was the kind lockstep, and it required that the heights of the calling and target tiles be exactly the same expression. In the full embodiment, the flexibility of the lockstep kind is expanded by allowing the heights of the calling and target tiles/cell sets to differ by a constant. The full embodiment will retain the ability to ensure that every tame SDF has a principal regular generalization. This extension provides for an SDF that generates a list iteratively and has a special formula for the first element. It is of course contemplated that a scenario initializing the sum to 0 and then using a consistent formula/operation may be applied, but such a transformation may not always be naturally apparent in more complex cases. Thus, for a derivative SUM function shown as:

```
function SUM2(t1 A1::{3,1}) returns B3^{r3} {
    t2 B1 = A1^{r1}
    t3 B2::{2,1} = B1^{r2, r3} + A2^{r1}
},                                                    (Function 16)
``` consider the following generalization:

```
function SUM2⟨α⟩ (t1 A1::{α+1,1}) returns B{α+1}^{r3} {
    t2 B1 = A1^{r1}
    t3 B2::{α,1} = B1^{r2, r3} + A2^{r1}
},                                                    (Function 17)
``` in which the operation for t3 has an unstable reference to t1, even though their heights differ by 1.

For such embodiments, with the calling and target heights of a lockstep reference allowed to differ by a constant, a definition of a well behaved reference is provided. First, multiple target tiles/cell sets are accounted for. For instance, the "overall target range" of a reference $\hat{\rho}$ in the original SDF $\hat{T}$ is the range of all cells read by $\hat{\rho}$ with respect to any caller cell. This may be computed as the range from the upper-left corner of $\hat{\rho}$ evaluated at the upper-left corner of the caller to the lower-right corner of $\hat{\rho}$ evaluated at the lower-right corner of the caller. In scenarios where the original SDF $\hat{T}$ is tame, it follows that all of these cells are read. A target tile of $\hat{T}$ is "vertically final" if it overlaps the last row of the overall target range and "horizontally final" if it overlaps the last column. In the context of an elastic SDF $\hat{F}$ as a potential generalization of $\hat{T}$, a target tile of a reference $\hat{\rho}$ is said to be vertically or horizontally final if the corresponding target tile of the corresponding reference in $\hat{T}$ is also vertically or horizontally final.

Regarding well behaved references in the fully described embodiment here, a range reference $\hat{\rho}$ appearing in the formula/operation of a caller tile tc in an elastic SDF $\hat{F}$ is well behaved if it is well behaved on both axes. The column axis may be treated analogously. Thus, $\hat{\rho}$ is well behaved on the row axis if every vertically non-final target tile has constant height, and every vertically final target tile tt stands in one of the following four relationships to each of the two row references $\overline{\chi}$ in $\hat{\rho}$. First, for "inelastic", the height of tt is constant, $\overline{\chi}$ is stable, and its coordinate is constant. Second, for "lockstep", the heights of tc and tt are non-constant but their difference is a constant, and $\overline{\chi}$ is relative with a constant coordinate. Third, for "start", the height of tt is non-constant, and $\overline{\chi}$ is superstable and points at a constant nonnegative offset above the top row of tt. Furthermore, if $\overline{\chi}$ is the bottom endpoint of $\hat{\rho}$ and the offset is zero, then the height of tt includes a positive constant. Fourth, for "end", the height of tt is non-constant, and $\overline{\chi}$ is superstable and points to the bottom row of tt. Still further, if $\overline{\chi}$ is the top endpoint of $\hat{\rho}$, then the height of tt includes a positive constant. The well-behavedness condition further requires that if $\overline{\chi}1$: $\overline{\chi}2$ is the row span reference of $\hat{\rho}$, then the pair of relationships of $\overline{\chi}1$ and $\overline{\chi}2$ to tt must not be (lockstep, start) or (end, lockstep).

Constraints generation for the fully described embodiments above is, like the simplified embodiments, premised in that for a given row or column reference $\overline{\chi}$ that is part of a range reference $\hat{\rho}$ in $\hat{T}_0$, and a given target tile tt of $\hat{\rho}$, the possible relationships of $\chi$ to tt may be narrowed in any regular generalization of $\hat{F}$ to inelastic and at most one other kind, based on whether $\overline{\chi}$ is relative, based on the height of the caller tile, and based on where $\chi$ points in relation to tt in $\hat{F}$. The constraint generation procedure in detail, for a range reference $\hat{\rho}$ in $\hat{T}_0$ may be described as follows, according to embodiments.

First, the height delta variable of each vertically non-final target tile of $\hat{\rho}$ is constrained equal to 0. Next, for each vertically final target tile tt of $\hat{\rho}$ and each of the two row references $\overline{\chi}$ that appears in $\hat{\rho}$, let $\hat{\alpha}_t$ and $\hat{\alpha}_c$ be the height delta variables of tt and tc, let $\hat{\alpha}$ be the delta variable of $\overline{\chi}$, and try the cases for the four kinds below in order. However, if the pair of cases for the two row references in relation to the same target tile tt would be either (lockstep, start) or (end, lockstep), in that order, then use (inelastic, inelastic) instead.

Continuing now, for lockstep (a), if $\overline{\chi}$ is relative and the initial heights of tt and tc are at least 2, then the relationship of $\overline{\chi}$ to tt may be initially determined as lockstep by constraints manager 212, but it may turn out to be inelastic. Thus, constraints manager 212 may be configured to constrain $\hat{\alpha}_t = \hat{\alpha}_c$ and $\hat{\alpha} = 0$.

If the determination for lockstep is found to be otherwise than the stated stipulation, next, for start (b), if the initial height of tt is at least 2, $\overline{\chi}$ is superstable, and the corresponding $\chi$ points at or above the top row of tt $\hat{F}$, then the relationship may be initially determined as start by constraints manager 212, but it may turn out to be inelastic. Constraints manager 212 may then be configured to constrain $\hat{\alpha} = 0$, and if $\chi$ points exactly to the top row of tt and $\overline{\chi}$ represents the bottom of $\hat{\rho}$, to constrain the height of tt to be at least 1.

If the determination for start is found to be otherwise than the stated stipulation, next, for end (c), if the initial height of tt is at least 2, $\overline{\chi}$ is superstable, and the corresponding $\chi$ points to the bottom row of tt in $\hat{F}$, then the relationship may be initially determined as end by constraints manager 212, but it may turn out to be inelastic. Thus, constraints manager 212 may then be configured to constrain $\hat{\alpha} = \hat{\alpha_t}$, and if $\overline{\chi}$ represents the top of $\tilde{\rho}$, to constrain the height of tt to be at least 1.

If the determination for end is found to be otherwise than the stated stipulation, next, for inelastic (d), the relationship must be inelastic, and constraints manager 212 constrains $\hat{\alpha_t} = \hat{\alpha} = 0$, and if $\overline{\chi}$ is relative, constrains $\hat{\alpha_c} = 0$ to ensure that $\overline{\chi}$ will be stable.

The analogues of the steps above may also be performed for the column axis.

C. Embodiments for Execution of Elastic SDFs

As noted herein, systems and devices may be configured in various ways to perform their respective functions. In the Sections above, embodiments were provided for notation form, syntax, and semantics of an elastic SDF, which corresponds an execution model that utilizes a target-tile label on each reference to disambiguate the references. Implementations based on this model are contemplated in embodiments, while in this Section additional embodiments for execution are also provided. Such embodiments enable further efficiently-implemented elastic SDFs for execution.

Figure 7:
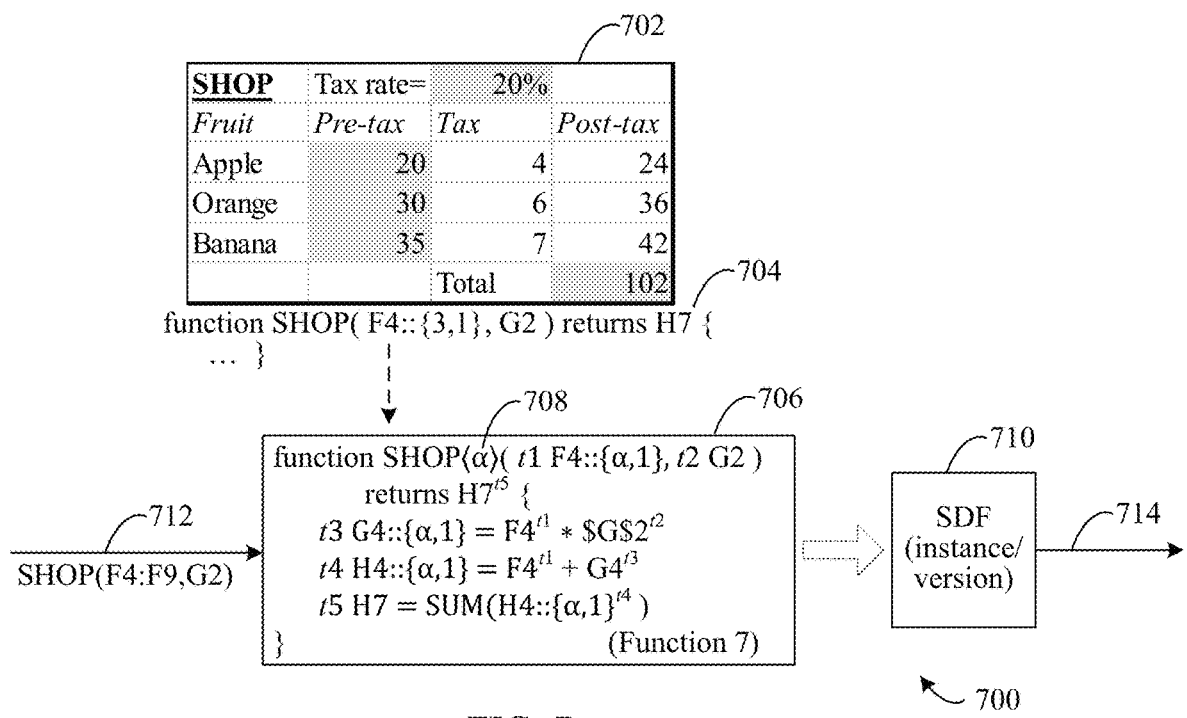
FIG. 7 shows a block diagram of a system for generation and execution of elastic sheet-defined functions and arrays, according to an example embodiment.

As noted above for system 200 in FIG. 2, generalization manager 208 includes execution manager 214 and range determiner 216 which may be configured to perform tasks for elastic SDF execution. FIG. 7 shows a block diagram of a system 700 for generation and execution of elastic sheet-defined functions and arrays, in accordance with an example embodiment. System 700 may be an embodiment of system 200. System 700 is described as follows.

System 700 includes an application 702 with a defined function SHOP 704, as described in example embodiments above. Application 702 may be one of application(s) 224 of FIG. 2, exemplarily shown as a spreadsheet program displaying a sheet in FIG. 7. Defined function SHOP 704 is inelastic and has static, non-variable input vectors F4::{3,1} and G2. System 700 also includes an elastic SDF SHOP 706 having a length variable α 708. Elastic SDF SHOP 706 may be generalized and created from defined function SHOP 704, according to embodiments described above. Elastic SDF SHOP 706 may be stored in a memory, e.g., similar to memory 206 of system 200 in FIG. 2. System 700 may further include additional components (not shown for brevity and illustrative clarity) including, but not limited to, components and subcomponents of other devices and/or systems herein, as well as those described below with respect to FIGS. 10 and 11, such as a processor, memory, an operating system, etc.

Additional details regarding system 700 and its components are provided below.

Figure 8:
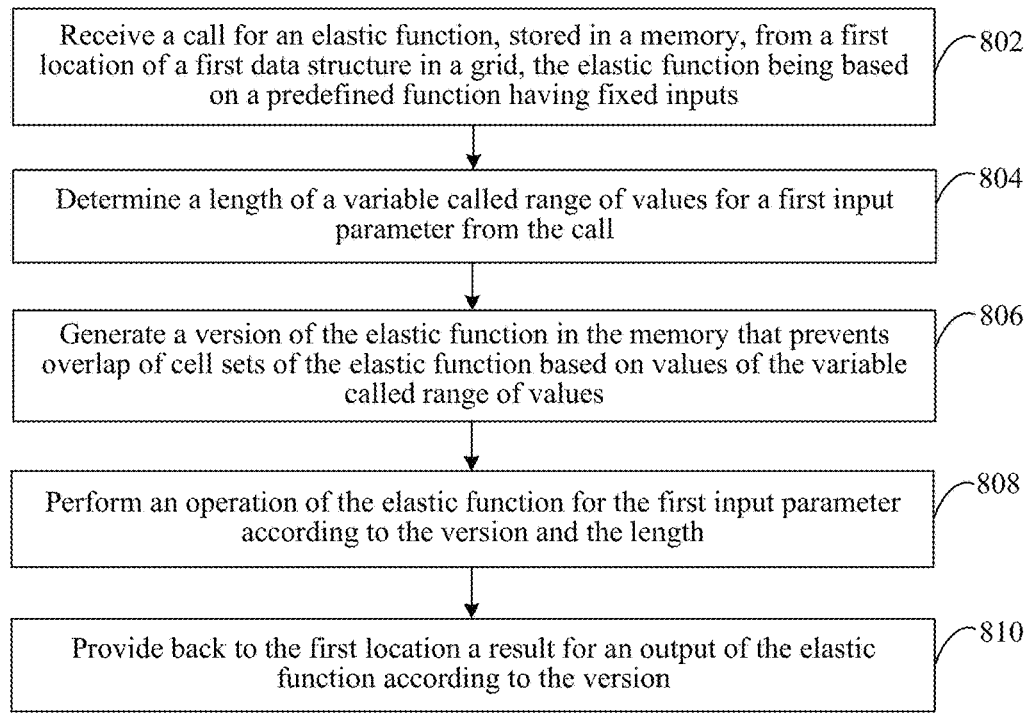
FIG. 8 shows a flowchart for generation and execution of elastic sheet-defined functions and arrays, in accordance with an example embodiment.

For instance, FIG. 8 shows a flowchart 800 for generation and execution of elastic sheet-defined functions and arrays, according to an example embodiment. System 700, execution manager 214, and/or range determiner 216 may operate according to flowchart 800, in embodiments. Further structural and operational examples will be apparent to persons skilled in the relevant art(s) based on the following description. Flowchart 800 is described as follows with respect to system 200 of FIG. 2 and system 700 of FIG. 2.

Flowchart 800 begins at step 802. In step 802, a call for an elastic function, stored in a memory, is received from a first location of a first data structure in a grid, the elastic function being based on a predefined function having fixed inputs. System 700 may be configured to receive a call for an elastic function from an application such as application 702. For instance, application 702 may be executing at system 700, and a user may input a call 712 for elastic SDF SHOP 706. Call 712 may be made from a location in application 702, such as a cell or cell set in the grid shown, or in any other portion of the grid of application 702. As shown, call 712 includes two input vectors F4:F9 and G2.

In step 804, a length of a variable called range of values for a first input parameter is determined from the call. For example, range determiner 216 of FIG. 2 may be configured to determine the length of an input vector with a variable called range of values of call 712. As illustrated, the input vector F4:F9 includes 6 values, but it is contemplated that any non-zero number of values for input vectors may be used. For the input vector F4:F9, range determiner 216 would determine a length of 6, while for the input vector G2, a length of one would be determined.

In step 806, a version of the elastic function that prevents overlap of cell sets of the elastic function is generated based on values of the variable called range of values. As shown in FIG. 7, an elastic SDF version/instance 710 is generated based on elastic SDF SHOP 706. Elastic SDF version/instance 710 is also generated based on the variable called range of values. For instance, in some embodiments, the length of the input vectors may be utilized to generate elastic SDF version/instance 710 according to length variable α 708 taking the called length, and in some embodiments, the position(s) of the input vectors may be utilized. In generating elastic SDF version/instance 710, system 700 prevents overlaps of tiles/cell sets that could occur for elastic SDF SHOP 706 when sizes of tiles/cell sets are dynamically increased causing overlap based on the variable called range of values in call 712. Further details regarding overlap prevention are described below.

In step 808, an operation of the elastic function is performed for the first input parameter according to the version and the length. For example, execution manager 214 may be configured to perform an operation of elastic SDF SHOP 706 according to elastic SDF version/instance 710. Considering tile/cell set t5 of elastic SDF SHOP 706 which has an operation to set H7 equal to the SUM of a number of cells locally identified at H4, and based on the value (e.g., 6) provided for length variable α 708 in this case, the operation for t5 in elastic SDF version/instance 710 may be performed, although it is also contemplated that any of the operations for t3 and/or t4 may also be performed as each of these tiles/cell sets is based on an input vector of elastic SDF SHOP 706.

In step 810, a result for an output of the elastic function is provided back to the first location. For example, execution manager 214 may be configured to provide a final result for an output 714 of elastic SDF SHOP 706, performed via elastic SDF version/instance 710 in cell H7, to the calling location, e.g., a cell of application 702 in which the syntax for call 712 is present ("SHOP(F4:F9,G2)").

Regarding overlap, as noted above, novel embodiments herein provide for elastic SDFs that avoid overlap between tiles/cell sets when instantiating length variables. An elastic SDF $\tilde{f}$ is overlap-free if no two of its tiles/cell sets overlap for any length variable assignment. There are several example embodiments herein and below illustrating various ways to ensure that overlap of tiles/cell sets does not occur.

Figure 9A:
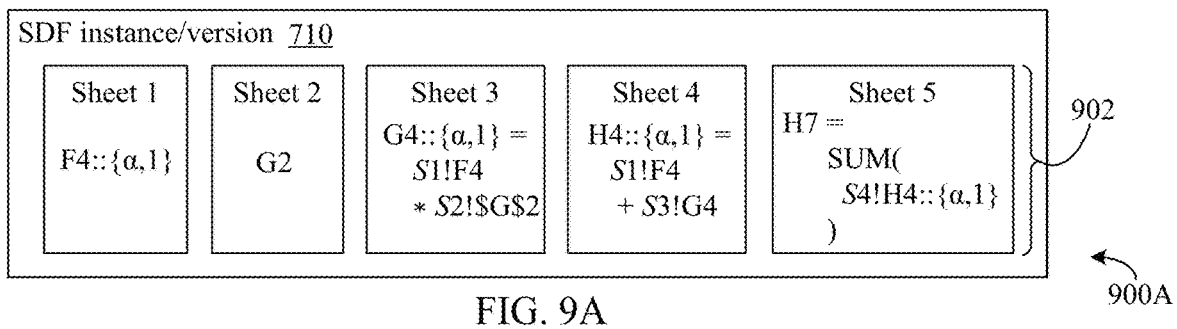
FIGS. 9A-9C show diagrams of sheet-defined function instances of FIG. 7 for generation and execution of elastic sheet-defined functions and arrays, in accordance with example embodiments.
Figure 9B:
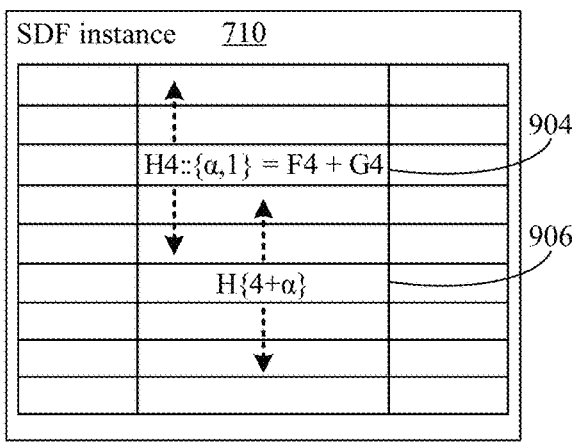
Figure 9C:
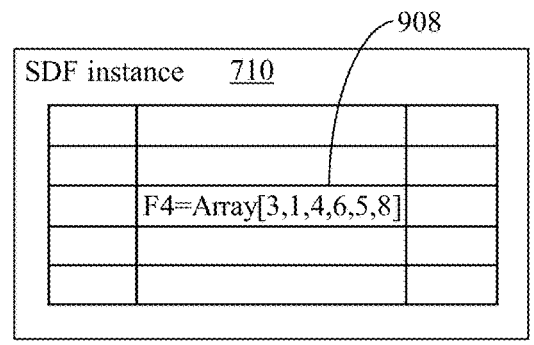

FIGS. 9A-9C described below show diagrams of elastic SDF version/instance 710 of FIG. 7 for generation and execution of elastic sheet-defined functions and arrays, in accordance with example embodiments.

In one embodiment, multiple worksheets may be generated, e.g., dynamically, and utilized to avoid tile/cell set overlaps. If the elastic SDF $\tilde{\mathcal{F}}$ is basic such that each reference has exactly one target tile/cell set, then the translation to a version (referred to as an instance for brevity hereinafter) of the elastic SDF $\tilde{\mathcal{F}}$ includes placing each tile/cell set on a separate sheet or worksheet. For example, an instance of the example SHOP function referred to herein that uses a "!" notation for worksheet references, for illustration and not limitation, may be provided as:

```
function SHOP<a>(S1!F4::{α,1}, S2!G2 ) returns S5!H7 {
    S3!G4::{α,1} = S1!F4 * S2!$G$2
    S4!H4::{α,1} = S1!F4 + S3!G4
    S5!H7 = SUM(S4!H4::{α,1})
} .                                          (Function 18)
```

As shown in Function 18, there is no risk of overlap as tiles/cell sets are on separate sheets S4, S5 for intermediary operations of the elastic SDF.

This embodiment is illustrated in FIG. 9A which shows an elastic SDF instance 900A for generation and execution of elastic sheet-defined functions and arrays, according to an example embodiment. Elastic SDF instance 900A is presented in the context of elastic SDF instance 710 of FIG. 7 which is an instance of the SHOP function discussed herein, specifically elastic SDF SHOP 706. As shown, elastic SDF instance 900A includes sheets 902 (e.g., worksheets by illustrative example): sheet 1, sheet 2, sheet 3, sheet 4, and sheet 5. Each of sheets 902 corresponds to a respective one of the tiles/cell sets of elastic SDF SHOP 706. In this manner, overlap between tiles/cell sets of the SDF is avoided entirely as each sheet of sheets 902 contains only a single tile/cell set.

In embodiments, sheets 902 may be dynamically generated when an elastic SDF is called, while in other embodiments sheets 902 may be generated at creation of an elastic SDF.

If $\tilde{\mathcal{F}}$ is not basic, overlap may be avoided as follows. First, each tile/cell set may be moved to a separate worksheet. Then, for each labelled range reference $\bar{\rho} = \overline{\rho}^{t1}, \ldots, ^{tk}$, a new worksheet may be generated that copies t1, ..., tk from their respective worksheets, which occurs without collisions because $\tilde{\mathcal{F}}$ is well-defined, $\bar{\rho}$ may be updated to refer to the new worksheet.

In another embodiment, also briefly described above, tiles/cell sets may be moved to avoid overlap for execution. For example, tiles may be moved within the single worksheet so they do not collide with each other. Compared to using multiple worksheets, this approach has the advantage that the transformed SDF instance bears a greater resemblance to the original SDF in case the user needs to view it for debugging, thus enhancing the UI operation for the user and the program tools themselves. For example, an instance of the example SHOP function referred to herein that moves worksheet references, for illustration and not limitation, may be provided as:

```
function SHOP⟨α⟩( F4::{α,1}, G2 ) returns H{4+α} {
    G4::{α,1} = F4 * $G$2
    H4::{α,1} = F4 + G4
    H{4+α} = SUM(H4::{α,1})
} .                                          (Function 19)
```

As shown in Function 19, there is no risk of overlap as tiles/cell may be intelligently moved, e.g., H{4+α} moves down as α increases.

In other words, by anchoring the final tile/cell set at H{4+α}, rather than H7 as in the example of the SHOP function previously provided, the final tile/cell set will move downwards as α increases, avoiding the overlap with the tile/cell set anchored at H4. This transformation is nontrivial in general, and produces an extended elastic SDF in which the upper-left corner of a tile/cell set may involve a linear combination of length variables, which extends the form notation grammar/syntax of Table 1.

This embodiment is illustrated in FIG. 9B which shows an elastic SDF instance 900B for generation and execution of elastic sheet-defined functions and arrays, according to an example embodiment. Elastic SDF instance 900B is also presented in the context of elastic SDF instance 710 of FIG. 7 which is an instance of the SHOP function discussed herein, specifically elastic SDF SHOP 706. As shown, elastic SDF instance 900B includes a tile/cell set 904 for H4::{α, 1} and an anchor cell 906 corresponding to H7 of elastic SDF SHOP 706. Because elastic SDF SHOP 706 may take different sizes of input vectors, the range of tile/cell set 904 may vary based on inputs in the call to the SDF (e.g., the range may shrink or expand with respect to the defined input vector size of 3 in the original SHOP function. If H7 is fixed in position, and H4::{α, 1} operates for a vector input size that is greater than 3, there will be overlap as H4::{α, 1} expands and collides with H7. However, as illustrated in anchor cell 906, elastic SDF instance 900B is generated such that H7 is replaced with H{4+α} that allows for repositioning of anchor cell 906 as H4::{α, 1} expands.

In embodiments, anchor cell 906 may be dynamically generated when the elastic SDF is called, while in other embodiments anchor cell 906 may be generated at creation of the elastic SDF.

In another embodiment, an SDF may be transformed to use an array to represent each tile/cell set. The two previous embodiments may, in essence, transform an elastic SDF into another elastic SDF that is constructed such that overlaps cannot occur. These elastic SDFs can be interpreted according to a simplified form of the notation form and semantics above without references needing to track tiles/cell sets. In this embodiment, given a spreadsheet interpreter that supports arrays-in-cells, an elastic SDF may be transformed to an ordinary SDF, where each tile is replaced with an array in its top-left corner to generate in SDF instance. For example, in the SHOP function, an input vector (of whatever size) can land wholesale in the cell F4, the intermediate cells (also of whatever size) can land in G4 and H4, and no collision arises:

```
function SHOP( F4, G2 ) returns H7 {
    G4 = F4 * $G$2    /* F4 is an array—operator '*' lifts over its elements */
    H4 = F4 + G4 /* F4 and G4 are arrays—operator '+' lifts over both arrays*/
    H7 = SUM(H4)      /* H4 is an array—SUM adds up its elements */
} .                                          (Function 19)
```

Not apparent in this definition is the expectation that the first parameter is a vector and the second is a scalar, but spreadsheets are typically dynamically typed.

This embodiment is illustrated in FIG. 9C which shows an elastic SDF instance 900C for generation and execution of elastic sheet-defined functions and arrays, according to an example embodiment. Elastic SDF instance 900C is presented in the context of elastic SDF instance 710 of FIG. 7 which is an instance of the SHOP function discussed herein, specifically elastic SDF SHOP 706. As shown, elastic SDF instance 900C includes a cell 908, e.g., F4, having an array-in-cell implementation with a six-value array. Thus, even though cell 908 includes 6 values for performing the function, cell 908 is a singleton cell with a height and a width of one. In this manner, overlap between tiles/cell sets of the SDF is avoided entirely as a single cell, e.g., cell 908, may include any number of values in an array.

In embodiments, the arrays-in-cells implementation shown for cell 908 may be dynamically generated when the elastic SDF is called, while in other embodiments it may be generated at creation of the elastic SDF.

The lifting of operators like (+) and (*) over arrays creates efficient utilization of arrays-in-cells to transform simple SDFs, but transforming non-basic SDFs may not be as straightforward. For example, consider an attempt to write a COMPOUND function using arrays-as-cell-values:

```
function COMPOUND( A3, F3, F1, A4 ) returns F4 {
  C4 = COLUMN( A4, 1) - SHIFT_DOWN( A3, COLUMN( A4, 1) )
  D4 = POWER(1+$F$1, C4)
  E4 = SHIFT_DOWN( F3, F4 ) * D4 /* But array E4 depends on F4 */
  F4 = E4 + COLUMN(A4,2)           /* and F4 depends on E4 */
}.                                                    (Function 20)
```

While a reference that targets a single tile/cell set simply becomes a reference to the corresponding array, a reference that targets multiple tiles/cell sets becomes a specially constructed array. For instance, the reference $A3^{ts,\ tx}$ in the original function becomes the array SHIFT_DOWN(A3, COLUMN(A4, 1)), where the function COLUMN extracts the first column of the two-column array A4, and the function SHIFT_DOWN inserts the element A3 at the front of the resulting array while dropping its last element. Similarly, the reference $F3^{t0,\ t4}$ becomes the array SHIFT_DOWN(F3, F4).

Thus, a cyclic dependency between arrays E4 and F4 is present where each depends on the other. There is a dependence between items in columns E and F in the original example, but because the items are in separate cells, a spreadsheet interpreter may select a raster-scan schedule without any cycles. By placing these columns within arrays, the interpreter is forced to evaluate one or other column first, leading to a loop. In an embodiment, the interpreter may be configured, according to embodiments, to utilize a "lazy" array to represent each tile, avoiding the loop. For example, each lazy array may include of an array of "thunks," each being a memoized, argumentless "lambda." In other embodiments, as an alternative to lazy arrays, array-processing functions that capture particular schedules such as raster scan, as illustrated by the following corrected version of the function COMPOUND from Function 20, are introduced:

```
function COMPOUND( A3, F3, F1, A4 ) returns F4 {
  C4 = COLUMN( A4, 1) - SHIFT_DOWN( A3, COLUMN( A4, 1) )
  D4 = POWER(1+$F$1, C4)
```

```
  F4 = VSCAN2( D4, COLUMN( A4, 2 ), F3,
       LAMBDA( bal, int, amt, bal * int + amt ) )
}.                                                    (Function 21)
```

The function VSCAN2 runs down two arrays in parallel, with an accumulator and a lambda-expression. Per embodiments, a large class of elastic SDFs can be efficiently implemented by transformation to concrete SDFs using arrays-as-cell-values, with appeal to implicit lifting and to explicit array-functions such as COLUMN and VSCAN2.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including without limitation system 200 of FIG. 2, system 700 of FIG. 7, elastic SDF instance 900A of FIG. 9A, elastic SDF instance 900B of FIG. 9B, and elastic SDF instance 900C of FIG. 9C, along with any components and/or subcomponents thereof, as well as any flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 10:
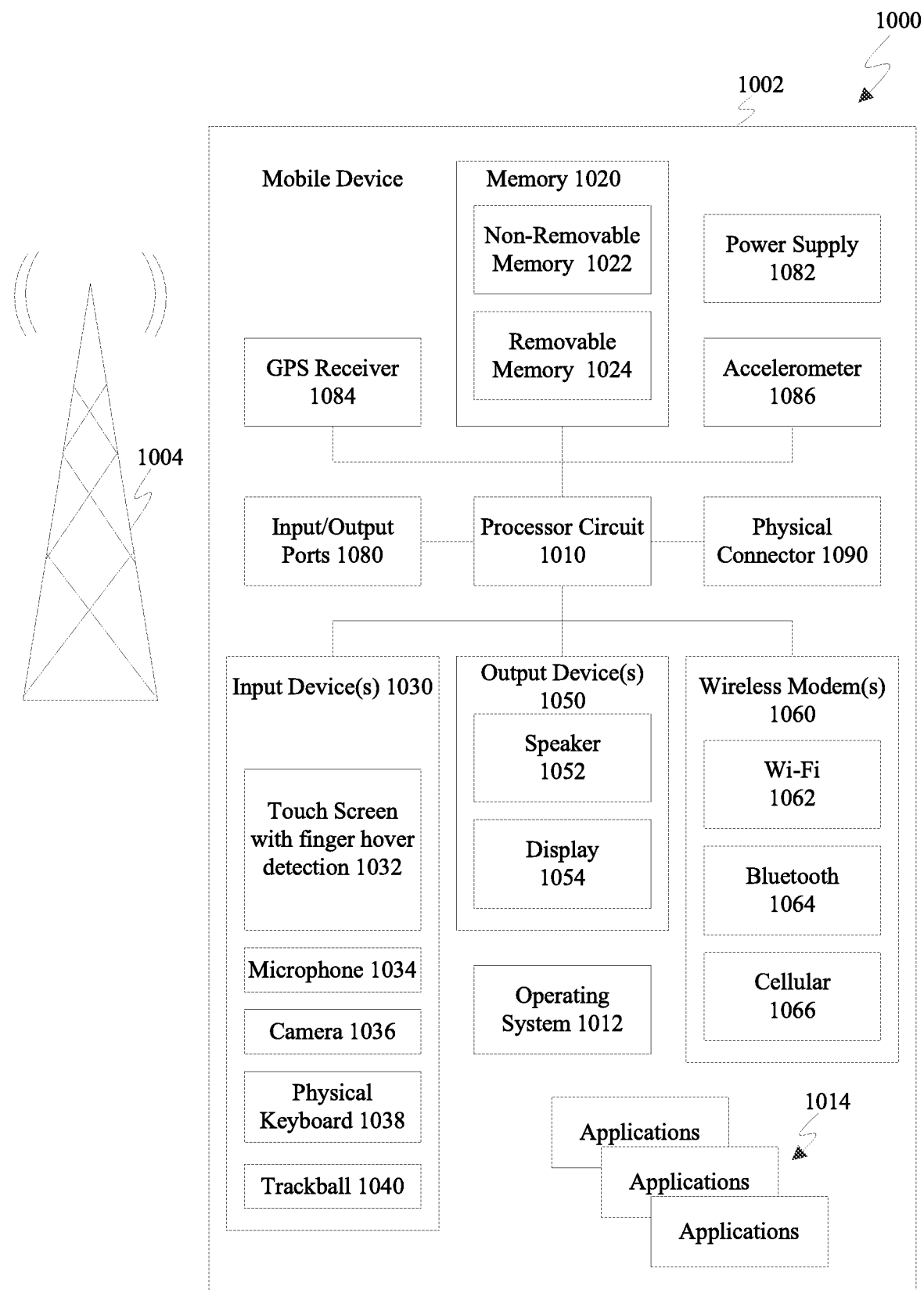
FIG. 10 shows a block diagram of an example mobile device that may be used to implement various example embodiments.

FIG. 10 is a block diagram of an exemplary mobile system 1000 that includes a mobile device 1002 that may implement embodiments described herein. For example, mobile device 1002 may be used to implement any system, client, or device, or components/subcomponents thereof, in the preceding sections. As shown in FIG. 10, mobile device 1002 includes a variety of optional hardware and software components. Any component in mobile device 1002 can communicate with any other component, although not all connections are shown for ease of illustration. Mobile device 1002 can be any of a variety of computing devices (e.g., cell phone, smart phone, handheld computer, Personal Digital Assistant (PDA), etc.) and can allow wireless two-way communications with one or more mobile communications networks 1004, such as a cellular or satellite network, or with a local area or wide area network.

Mobile device 1002 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components of mobile device 1002 and provide support for one or more application programs 1014 (also referred to as "applications" or "apps"). Application programs 1014 may include common mobile computing applications (e.g., e-mail applications, calendars, contact managers, web browsers, messaging applications) and any other computing applications (e.g., word processing applications, mapping applications, media player applications).

Mobile device 1002 can include memory 1020. Memory 1020 can include non-removable memory 1022 and/or removable memory 1024. Non-removable memory 1022 can include RAM, ROM, flash memory, a hard disk, or other well-known memory devices or technologies. Removable memory 1024 can include flash memory or a Subscriber Identity Module (SIM) card, which is well known in GSM communication systems, or other well-known memory devices or technologies, such as "smart cards." Memory 1020 can be used for storing data and/or code for running operating system 1012 and application programs 1014. Example data can include web pages, text, images, sound files, video data, or other data to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing one or more of system 200 of FIG. 2, system 700 of FIG. 7, elastic SDF instance 900A of FIG. 9A, elastic SDF instance 900B of FIG. 9B, and elastic SDF instance 900C of FIG. 9C, along with any components and/or sub-components thereof, as well as the flowcharts/flow diagrams described herein, including portions thereof, and/or further examples described herein.

Mobile device 1002 can support one or more input devices 1030, such as a touch screen 1032, a microphone 1034, a camera 1036, a physical keyboard 1038 and/or a trackball 1040 and one or more output devices 1050, such as a speaker 1052 and a display 1054. Other possible output devices (not shown) can include piezoelectric or other haptic output devices. Some devices can serve more than one input/output function. For example, touch screen 1032 and display 1054 can be combined in a single input/output device. Input devices 1030 can include a Natural User Interface (NUI).

One or more wireless modems 1060 can be coupled to antenna(s) (not shown) and can support two-way communications between processor 1010 and external devices, as is well understood in the art. Modem 1060 is shown generically and can include a cellular modem 1066 for communicating with the mobile communication network 1004 and/or other radio-based modems (e.g., Bluetooth 1064 and/or Wi-Fi 1062). At least one wireless modem 1060 is typically configured for communication with one or more cellular networks, such as a GSM network for data and voice communications within a single cellular network, between cellular networks, or between the mobile device and a public switched telephone network (PSTN).

Mobile device 1002 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components of mobile device 1002 are not required or all-inclusive, as any components can be deleted and other components can be added as would be recognized by one skilled in the art.

In an embodiment, mobile device 1002 is configured to implement any of the above-described features of flowcharts herein. Computer program logic for performing any of the operations, steps, and/or functions described herein may be stored in memory 1020 and executed by processor 1010.

Figure 11:
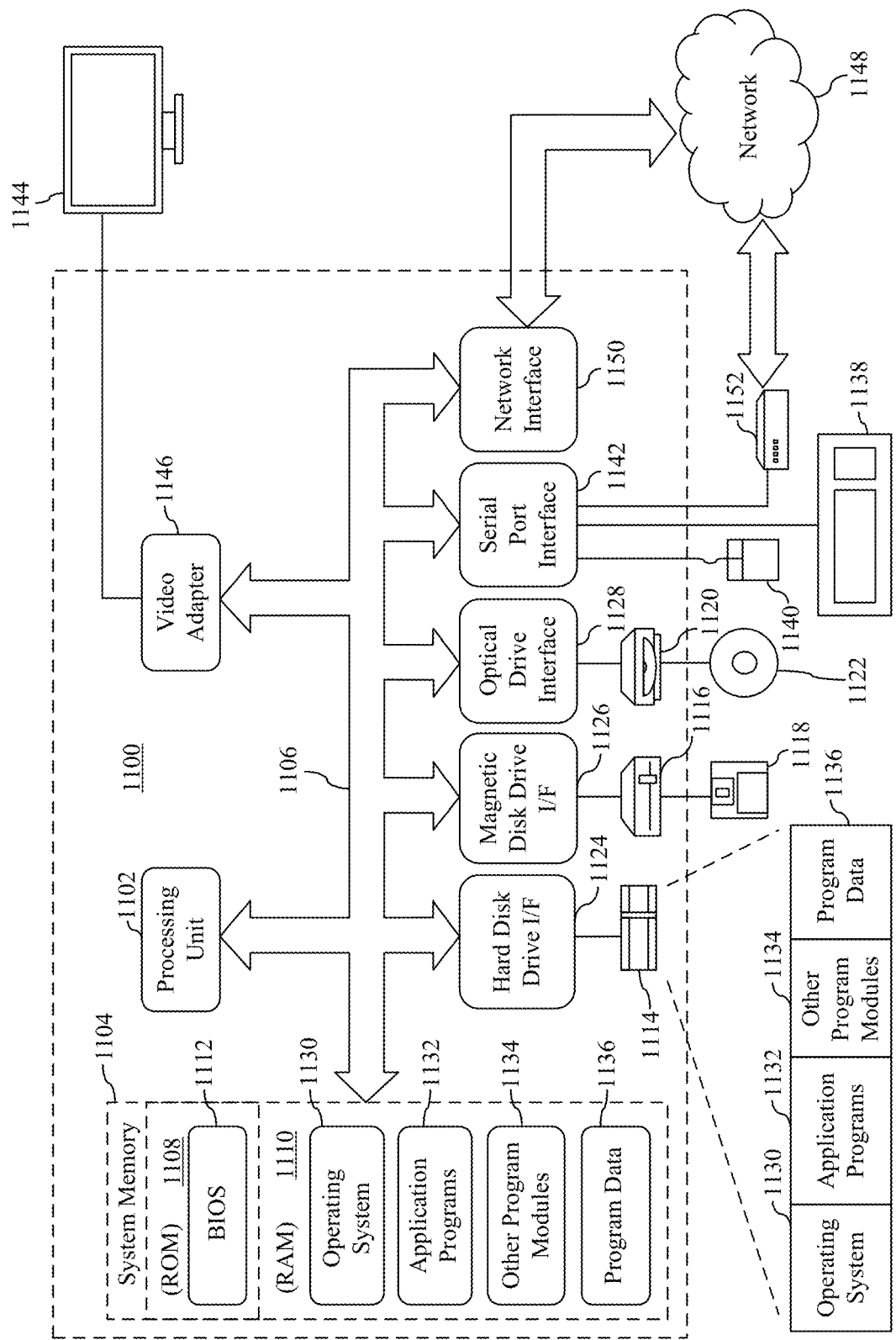
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 200 of FIG. 2, system 700 of FIG. 7, elastic SDF instance 900A of FIG. 9A, elastic SDF instance 900B of FIG. 9B, and elastic SDF instance 900C of FIG. 9C, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described embodiments provide for more efficient operation and debugging of formulaic applications. As an example, multiple copies of a function for different sized input parameters are permanently stored as separate copies of the function, while the instant embodiments provide for generating instances of a single, elastic function. Accordingly, file sizes and complexity are reduced resulting in less persistent storage.

Moreover, the described embodiments do not exist in software implementations for generation and execution of elastic sheet-defined functions and arrays. Conventional solutions lack the ability automatically generate elastic functions that are capable of taking input vectors of any size from user-defined functions with fixed-size inputs, much less doing so in a manner that provides robust elastic SDFs that prevent collisions/overlap between tiles/cell sets.

Some embodiments herein are described in the context of spreadsheets or illustrative purposes, and not for limitation. As previously noted, embodiments are also directed to the user of arrays, e.g., in programming/software development environments. Generally, the embodiments herein describe systems and methods for taking computations defined on fixed-length examples, e.g., in a spreadsheet grid, and generalising them so that they work on examples of arbitrary length. This process may be referred to, at a high level, as elasticization. While the elasticization systems and processes herein are provided for making sheet-defined functions and programs utilizing arrays more efficient, robust, and powerful, this is not the only application of the described embodiments. It is contemplated in this disclosure that elasticization includes additional applications. For example, elasticization may be used to rewrite (or refactor) a spreadsheet calculation written for a fixed-size example as a calculation using arrays. Furthermore, elasticization may be used to detect and automatically resize "tiles" (or "cell sets") of various formulae, when the sizes of precedent tiles are changed by the user, thus saving the manual effort of resizing many tiles.

Detected tiles may also be utilized for UI enhancements. For instance, the current "precedents and dependents" feature of spreadsheet programs draws arrows between every cell that is a precedent/dependent of the current selection, which can become visually cluttered. Clutter of the UI may be reduced, e.g., by drawing only a single arrow between tiles that have a dependence relation as determined by the embodiments herein. Another UI enhancement includes presenting a warning to the user via the UI when a tile is partially copied and pasted (e.g., a row or column is omitted) as determined by the embodiments herein, as this is often an error. UIs are also improved by allowing a user to call a single function, multiple times, using any different input vector size, without having to redefine the function explicitly in the UI for each call with different input parameters.

As referenced above, Table 1 provides exemplary, non-limiting syntax for constraints and substitutions for illustration of embodiments described herein.

TABLE 1

| Elastic SDF generalisation ordering | |
|---|---|
| Length substitution | $\phi ::= \in \mid \phi, \alpha \mapsto 1 \mid \phi, \alpha \mapsto \beta + 1$ ($1 \in \mathbb{Z}^{\neq 0}$) |
| Constraint solving | |
| Delta variable | $\hat{\alpha}, \hat{\beta}$ |
| Delta constant | $\hat{i} \in \mathbb{Z}$ |
| Constraint | $Q ::= \hat{\alpha} = \hat{\beta} \mid \hat{\alpha} = 0 \mid \hat{\alpha} + \hat{i}_1 \geq \hat{i}_2$ |
| Intermediate substitution | $\theta ::= \in \mid \theta, \hat{\alpha} \mapsto \hat{\beta} \mid \theta, \hat{\alpha} \mapsto 0$ |
| Delta substitution | $\Theta ::= \in \mid \Theta, \hat{\alpha} \mapsto 0 \mid \Theta, \alpha \mapsto \alpha + i$ |

As referenced above, Table 2 provides exemplary, non-limiting definitions for illustration of embodiments described herein.

| | |
|---|---|
| $x \in \mathbb{Z}$ | coordinate |
| $m ::= x$ | axis position: row or column number |
| $N ::= A \mid \ldots \mid Z \mid AA \mid AB \mid \ldots$ | A1-style column name |
| $\mu ::= \$ \mid \text{``''}$ | A1-style absolute/relative marker |
| $\chi ::= \mu m$ | axis position reference |
| $s ::= m_1:m_2$ | span (top to bottom or left to right) |
| $\sigma ::= \chi_1:\chi_2$ | span reference (top to bottom or left to right) |
| $a ::= Nm$ | cell address (column, row) |
| $\theta ::= \mu_1 N \mu_2 m$ | cell reference |
| $l ::= x$ | span size |
| $r ::=$ | range |
| $\quad a$ | single cell |
| $\quad a_1:a_2$ | corner-corner (top left, bottom right) |
| $\quad a::\{l_1,l_2\}$ | corner-size (top left, height, width) |

-continued

| | |
|---|---|
| $\rho ::= \theta \mid \theta_1:\theta_2 \mid \theta::\{l_1,l_2\}$ | range reference |
| $F ::=$ | formula |
| $\quad \rho$ | range reference |
| $\quad c$ | constant |
| $\quad f(F_1, \ldots, F_n)$ | function call |
| $\mathcal{A} ::= r := F$ | range assignment |
| $\mathcal{S} ::= \mathcal{A}_1, \ldots, \mathcal{A}_n$ | sheet fragment |
| $n$ | SDF name |
| $\mathcal{F} ::= \text{function } n(r_1, \ldots, r_k)$ returns $r'$ $\{\mathcal{S}\}$ | SDF definition |
| $t$ | tile name |
| $\hat{\rho} ::= \rho^{t_1, \ldots, t_k}$ | labelled range reference ($k > 0$) |
| $\hat{F} ::= \hat{\rho} \mid c \mid f(\hat{F}_1, \ldots, \hat{F}_n)$ | labelled formula |
| $\hat{\mathcal{A}} ::= t\ r := \hat{F}$ | labelled range assignment |
| $\hat{\mathcal{S}} ::= \hat{\mathcal{A}}_1, \ldots, \hat{\mathcal{A}}_n$ | labelled sheet fragment |
| $\hat{\mathcal{F}} ::= \text{function } n(t_1\ r_1, \ldots, t_k\ r_k)$ returns $r'^{t_1, \ldots, t_j}$ $\{\hat{S}\}$ | labelled SDF definition |
| $\alpha$ | length variable |
| $u \in \mathbb{Z}^*$ | length variable coefficient |
| $\bar{x} ::= \{x + \Sigma_i u_i \alpha_i\}$ | elastic coordinate |
| $\bar{N} ::= \{N + \Sigma_i u_i \alpha_i\}$ | elastic A1-style column name |
| $\bar{m}, \bar{\chi}, \bar{s}, \bar{\sigma}, \bar{a}, \bar{\theta}, \bar{l}, \bar{r}, \bar{\rho}$ | analogous to above |
| $\tilde{\rho} ::= \bar{\rho}^{t_1, \ldots, t_k}$ | labelled elastic range reference |
| $\tilde{F} ::= \tilde{\rho} \mid c \mid f(\tilde{F}_1, \ldots, \tilde{F}_n)$ | elastic formula |
| $\tilde{\mathcal{A}} ::= t\ \bar{r} := \tilde{F}$ | elastic range assignment |
| $\tilde{\mathcal{S}} ::= \tilde{\mathcal{A}}_1, \ldots, \tilde{\mathcal{A}}_n$ | elastic sheet fragment |
| $\tilde{\mathcal{F}} ::= \text{function } n\langle \alpha_1, \ldots, \alpha_r \rangle$ $(t_1\ \bar{r}_1, \ldots, t_k\ \bar{r}_k)$ returns $\bar{r}'^{t_1, \ldots, t_j}$ $\{\tilde{S}\}$ | elastic SDF definition |

The additional examples and embodiments described in this Section may be applicable to examples disclosed in any other Section or subsection of this disclosure.

A system is described herein. The system may be configured and enabled in various ways for generating an elastic function from an inelastic function, as described herein. The system includes a processor and a memory that stores program code configured to be executed by the processor. The program code includes elasticity code and constraints code. The elasticity code is configured to modify a size identifier of a first cell set with a first delta variable, the first cell set having at least one cell and being an input having a fixed range size for a predefined function, and to modify a cell identifier of a range reference of a second cell set with a second delta variable, the range reference being included in an operation of the predefined function. The constraints code is configured to set a value limit for the first delta variable and the second delta variable based on the fixed range size. The elasticity code is further configured to generate an elastic function stored in the memory based on the value limit, the modified size identifier, and the modified cell identifier, the elastic function configured to take an input range of a size that is different than the fixed range size of the predefined function.

In an embodiment of the system, the first cell set is designated in the memory by a corner-size notation of a range associated therewith, and the size identifier is one of a height or a width. In the embodiment, to generate the value limit, the constraints code is configured to perform at least one of set the first delta variable to zero based on determining the height or the width of the first cell set is one, or, set the first delta variable to a value where the value constrains the height or the width to have a non-negative value.

In an embodiment of the system, to set the value limit, the constraints code is configured to generate a delta variable constraint for at least one of the first delta variable or the second delta variable, apply the delta variable constraint to at least one of the first delta variable or the second delta variable, and generate a constraint solution for the delta variable constraint.

In an embodiment of the system, the constraints code, to generate the constraint solution, is configured to remove an equality constraint to generate an intermediate constraint solution, apply the intermediate constraint solution to a remaining lower bound constraint of the first delta variable, and generate a length variable, having a delta constant, in place of the first delta variable.

In an embodiment of the system, to generate the delta variable constraint for the second delta variable, the constraints code is configured to determine if a span reference is lockstep, and subsequently set both of a delta variable of a first axis position reference and a delta variable of a second axis position reference to zero, and set a delta variable of a calling cell set equal to a delta variable of a target cell set. In an embodiment of the system, to generate the constraint solution, the constraints code is configured to determine if the span reference is whole, and subsequently set the delta variable of the first axis position reference to zero, and set the delta variable of the target cell set equal to the delta variable of the second axis position reference. In an embodiment of the system, to generate the constraint solution, the constraints code is configured to determine if the span reference is inelastic, and subsequently set each of the delta variable of the first axis position reference, the delta variable of the second axis position reference, and the delta variable of the target cell set, equal to zero.

In an embodiment of the system, the elastic function is associated with a grid of a spreadsheet application, and the elasticity code is configured to perform at least one of: assign a different worksheet for each range reference of the elastic function, assign an offset location value for one cell set of the elastic function, the offset location value based at least on an input range size and respective location of the one cell set, or assign an array-in-cell to another cell set of the elastic function.

In an embodiment of the system, the processor is configured to execute the elasticity code and the constraints code based on an initiation command from a spreadsheet application in which the inelastic function is defined in association with a grid. In the embodiment, the elastic function is stored in the memory in association with the spreadsheet application.

A computer-implemented method is also described herein. The computer-implemented method may be for generating an elastic function from an inelastic function, as described herein. The computer-implemented method includes modifying a size identifier of a first cell set with a first delta variable, the first cell set being an input having a fixed range size for a predefined function, and modifying a cell identifier of a range reference of a second cell set with a second delta variable, the range reference being included in an operation of the predefined function. The method also includes setting a value limit for the first delta variable and the second delta variable based on the fixed range size, and generating an elastic function stored in a memory based on the value limit, said modifying the size identifier, and said modifying the cell identifier, the elastic function configured to take an input range of a size that is different than the fixed range size of the predefined function.

In an embodiment of the computer-implemented method, the first cell set is designated in the memory by a corner-size notation of a range associated therewith, and the size identifier is one of a height or a width. In the embodiment, the method further includes at least one of setting the first delta variable to zero based on determining the height or the width of the first cell set is one, or, setting the first delta variable to a value where the value constrains the height or the width to have a non-negative value.

In an embodiment of the computer-implemented method, setting the value limit includes generating a delta variable constraint for at least one of the first delta variable or the second delta variable, applying the delta variable constraint to at least one of the first delta variable or the second delta variable, and generating a constraint solution for the delta variable constraint.

In an embodiment of the computer-implemented method, generating the constraint solution includes removing an equality constraint to generate an intermediate constraint solution, applying the intermediate constraint solution to a remaining lower bound constraint of the first delta variable, and generating a length variable, having a delta constant, in place of the first delta variable.

In an embodiment of the computer-implemented method, generating the delta variable constraint includes determining if a span reference is lockstep, and subsequently setting both of a delta variable of a first axis position reference and a delta variable of a second axis position reference to zero, and set a delta variable of a calling cell set equal to a delta variable of a target cell set. In an embodiment of the computer-implemented method, generating the constraint solution includes determining if the span reference is whole, and subsequently setting the delta variable of the first axis position reference to zero, and set the delta variable of the target cell set equal to the delta variable of the second axis position reference. In an embodiment of the computer-implemented method, generating the constraint solution includes determining if the span reference is inelastic, and subsequently setting each of the delta variable of the first axis position reference, the delta variable of the second axis position reference, and the delta variable of the target cell set, equal to zero.

In an embodiment of the computer-implemented method, the elastic function is associated with a grid of a spreadsheet application, and the computer-implemented method further includes at least one of assigning a different worksheet for each range reference of the elastic function, assigning an offset location value for one cell set of the elastic function, the offset location value based at least on an input range size and respective location of the one cell set, or assigning an array-in-cell to another cell set of the elastic function.

In an embodiment, the computer-implemented method includes storing the elastic function in the memory and in association with a spreadsheet application, and receiving an initiation command from the spreadsheet application in which the inelastic function is defined in association with a grid.

A computer-readable storage medium having program instructions recorded thereon that, when executed by a processing device, perform a method, is also described. The method may be for generating an elastic function from an inelastic function, as described herein. The method includes receiving a call for an elastic function, stored in a memory, from a first location of a first data structure in a grid, the elastic function being based on a predefined function having fixed inputs. The method also includes determining a length of a variable called range of values for a first input parameter from the call, and generating a version of the elastic function that prevents overlap of cell sets of the elastic function based on values of the variable called range of values. The method further includes performing an operation of the elastic function for the first input parameter according to the version and the length, and providing back to the first location a result for an output of the elastic function according to the version.

In an embodiment of the computer-readable storage medium, the first location includes a first cell, the first data structure is a first sheet of a spreadsheet application, the called range of values for the first input parameter includes a vector represented by one or more cells, and the length is a function-specific variable.

In an embodiment of the computer-readable storage medium, the version of the elastic function prevents overlap of the cell sets of the elastic function by providing the values of the called range of values to a range of cells that begins at a second cell of a second sheet of the spreadsheet application, and performing a first operation of the elastic function, the first operation performed at a third sheet of the spreadsheet application associated with the output and based on a reference to the values of the called range of values at the second sheet.

In an embodiment of the computer-readable storage medium, the version of the elastic function prevents overlap of the cell sets of the elastic function by providing the values of the called range of values to a range of cells that begins at a second cell of a second sheet of the spreadsheet application, and performing a first operation of the elastic function, the first operation performed at a third sheet of the spreadsheet application associated with the output and based on a reference to the values of the called range of values at the second sheet.

In an embodiment of the computer-readable storage medium, the elastic function includes a second input parameter, and the version of the elastic function prevents overlap of the cell sets of the elastic function by providing a value of the second input parameter to a third cell of a fourth sheet of the spreadsheet application, and performing a second operation of the elastic function, the second operation performed at a fifth sheet of the spreadsheet application and being based on a reference to the value of the second input parameter at the second sheet and the reference to the values of the called range of values at the second sheet. In the embodiment, performing a first operation of the elastic function in the method includes referencing a result of the second operation of the elastic function at the fifth sheet.

In an embodiment of the computer-readable storage medium, generating the instance of the elastic function in the method includes determining a number of range references associated with the elastic function subsequent to receiving the call, generating a number of sheets that corresponds to the number of range references, and assigning each of the range references to a different one of the number of sheets.

In an embodiment of the computer-readable storage medium, generating the instance of the elastic function in the method includes at least one of assigning an offset location value for a range reference subsequent to receiving the call, the offset location value based at least on the length of the called range of values and a location of the range reference, or converting a cell set of the elastic function to an array-in-cell structure by replacing a cell of the cell set with an array of values that corresponds to the first input parameter.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for generating an elastic function from an inelastic function of a software application, comprising:
    a processor; and
    a memory that stores program code, the program code configured to be executed by the processor, the program code including:
    elasticity code configured to:
        modify a size identifier of a first cell set with a first delta variable, the first cell set having at least one cell and being an input having a fixed range size for a predefined function of the software application; and
        modify a cell identifier of a range reference of a second cell set with a second delta variable, the range reference being included in an operation of the predefined function of the software application; and
    constraints code configured to:
        set a value limit for the first delta variable and the second delta variable based on the fixed range size;
    the elasticity code further configured to:
        generate an elastic function as application code of the software application stored in the memory based on the value limit, the modified size identifier, and the modified cell identifier, the elastic function configured to take an input range for data associated with the software application of a size that is different than the fixed range size of the predefined function.

2. The system of claim 1, wherein the first cell set is designated in the memory by a corner-size notation of a range associated therewith;
    wherein the size identifier is one of a height or a width; and
    wherein, to generate the value limit, the constraints code is configured to perform at least one of:
        set the first delta variable to zero based on determining the height or the width of the first cell set is one; or
        set the first delta variable to a value where the value constrains the height or the width to have a non-negative value.

3. The system of claim 1, wherein to set the value limit, the constraints code is configured to:
    generate a delta variable constraint for at least one of the first delta variable or the second delta variable;
    apply the delta variable constraint to at least one of the first delta variable or the second delta variable; and
    generate a constraint solution for the delta variable constraint.

4. The system of claim 3, wherein the constraints code, to generate the constraint solution, is configured to:
    remove an equality constraint to generate an intermediate constraint solution;
    apply the intermediate constraint solution to a remaining lower bound constraint of the first delta variable; and
    generate a length variable, having a delta constant, in place of the first delta variable.

5. The system of claim 3, wherein the constraints code, to generate the delta variable constraint for the second delta variable, is configured to:
    determine if a span reference is lockstep, and subsequently:

set both of a delta variable of a first axis position reference and a delta variable of a second axis position reference to zero, and set a delta variable of a calling cell set equal to a delta variable of a target cell set;

determine if the span reference is whole, and subsequently:
set the delta variable of the first axis position reference to zero, and set the delta variable of the target cell set equal to the delta variable of the second axis position reference; and determine if the span reference is inelastic, and subsequently:
set each of the delta variable of the first axis position reference, the delta variable of the second axis position reference, and the delta variable of the target cell set, equal to zero.

6. The system of claim 1, wherein the elastic function is associated with a grid of the software application that is a spreadsheet application; and
wherein the elasticity code is configured to perform at least one of:
assign a different worksheet for each range reference of the elastic function;
assign an offset location value for one cell set of the elastic function, the offset location value based at least on an input range size and respective location of the one cell set; or
assign an array-in-cell to another cell set of the elastic function.

7. The system of claim 1, wherein the processor is configured to execute the elasticity code and the constraints code based on an initiation command from the software application that is a spreadsheet application in which the inelastic function is defined in association with a grid; and
wherein the elastic function is stored in the memory in association with the spreadsheet application.

8. A computer-implemented method for generating an elastic function from an inelastic function of a software application, comprising
modifying a size identifier of a first cell set with a first delta variable, the first cell set being an input having a fixed range size for a predefined function of the software application;
modifying a cell identifier of a range reference of a second cell set with a second delta variable, the range reference being included in an operation of the predefined function of the software application;
setting a value limit for the first delta variable and the second delta variable based on the fixed range size; and
generating an elastic function as application code of the software application stored in a memory based on the value limit, said modifying the size identifier, and said modifying the cell identifier, the elastic function configured to take an input range for data associated with the software application of a size that is different than the fixed range size of the predefined function.

9. The computer-implemented method of claim 8, wherein the first cell set and the second cell set are designated in the memory by a corner-size notation of a range associated therewith; and
wherein the size identifier is one of a height or a width; the method further comprising at least one of:
setting the first delta variable to zero based on determining the height or the width of the first cell set is one; or
setting the first delta variable to a value where the value constrains the height or the width to have a non-negative value.

10. The computer-implemented method of claim 8, wherein setting the value limit includes:
generating a delta variable constraint for at least one of the first delta variable or the second delta variable;
applying the delta variable constraint to at least one of the first delta variable or the second delta variable; and
generating a constraint solution for the delta variable constraint.

11. The computer-implemented method of claim 10, wherein generating the constraint solution includes:
removing an equality constraint to generate an intermediate constraint solution;
applying the intermediate constraint solution to a remaining lower bound constraint of the first delta variable; and
generating a length variable, having a delta constant, in place of the first delta variable.

12. The computer-implemented method of claim 10, wherein generating the delta variable constraint includes at least one of:
determining if a span reference is lockstep, and subsequently:
setting both of a delta variable of a first axis position reference and a delta variable of a second axis position reference to zero, and set a delta variable of a calling cell set equal to a delta variable of a target cell set;
determining if the span reference is whole, and subsequently:
setting the delta variable of the first axis position reference to zero, and set the delta variable of the target cell set equal to the delta variable of the second axis position reference; or
determining if the span reference is inelastic, and subsequently:
setting each of the delta variable of the first axis position reference, the delta variable of the second axis position reference, and the delta variable of the target cell set, equal to zero.

13. The computer-implemented method of claim 8, wherein the elastic function is associated with a grid of the software application that is a spreadsheet application;
the method further comprising at least one of:
assigning a different worksheet for each range reference of the elastic function;
assigning an offset location value for one cell set of the elastic function, the offset location value based at least on an input range size and respective location of the one cell set; or
assigning an array-in-cell to another cell set of the elastic function.

14. The computer-implemented method of claim 8, further comprising:
storing the elastic function in the memory and in association with the software application that is a spreadsheet application; and
receiving an initiation command from the spreadsheet application in which the inelastic function is defined in association with a grid.

15. A computer-readable storage medium having program instructions recorded thereon that, when executed by a processing device, perform a method for generating an elastic function from an inelastic function of a software application, the method comprising:

modifying a size identifier of a first cell set with a first delta variable, the first cell set being an input having a fixed range size for a predefined function of the software application;

modifying a cell identifier of a range reference of a second cell set with a second delta variable, the range reference being included in an operation of the predefined function of the software application;

setting a value limit for the first delta variable and the second delta variable based on the fixed range size; and generating an elastic function as application code of the software application stored in a memory based on the value limit, said modifying the size identifier, and said modifying the cell identifier, the elastic function configured to take an input range for data associated with the software application of a size that is different than the fixed range size of the predefined function.

16. The computer-readable storage medium of claim 15, wherein the first cell set and the second cell set are designated in the memory by a corner-size notation of a range associated therewith;

wherein the size identifier is one of a height or a width; and wherein the method further comprises at least one of:
setting the first delta variable to zero based on determining the height or the width of the first cell set is one; or
setting the first delta variable to a value where the value constrains the height or the width to have a non-negative value.

17. The computer-readable storage medium of claim 15, wherein setting the value limit includes:
generating a delta variable constraint for at least one of the first delta variable or the second delta variable;
applying the delta variable constraint to at least one of the first delta variable or the second delta variable; and
generating a constraint solution for the delta variable constraint.

18. The computer-readable storage medium of claim 17, wherein generating the constraint solution includes:
removing an equality constraint to generate an intermediate constraint solution;
applying the intermediate constraint solution to a remaining lower bound constraint of the first delta variable; and
generating a length variable, having a delta constant, in place of the first delta variable.

19. The computer-readable storage medium of claim 17, wherein generating the delta variable constraint includes at least one of:
determining if a span reference is lockstep, and subsequently:
setting both of a delta variable of a first axis position reference and a delta variable of a second axis position reference to zero, and set a delta variable of a calling cell set equal to a delta variable of a target cell set;
determining if the span reference is whole, and subsequently:
setting the delta variable of the first axis position reference to zero, and set the delta variable of the target cell set equal to the delta variable of the second axis position reference; or
determining if the span reference is inelastic, and subsequently:
setting each of the delta variable of the first axis position reference, the delta variable of the second axis position reference, and the delta variable of the target cell set, equal to zero.

20. The computer-readable storage medium of claim 15, wherein the elastic function is associated with a grid of the software application that is a spreadsheet application; and
wherein the method further comprises at least one of:
assigning a different worksheet for each range reference of the elastic function;
assigning an offset location value for one cell set of the elastic function, the offset location value based at least on an input range size and respective location of the one cell set; or
assigning an array-in-cell to another cell set of the elastic function.

* * * * *